(12) United States Patent
Koga et al.

(10) Patent No.: US 11,469,650 B2
(45) Date of Patent: Oct. 11, 2022

(54) METHOD FOR MANUFACTURING ARMATURE

(71) Applicant: AISIN CORPORATION, Kariya (JP)

(72) Inventors: Kiyotaka Koga, Nishio (JP);
Tomotsugu Sugihara, Okazaki (JP)

(73) Assignee: AISIN CORPORATION, Kariya (JP)

( * ) Notice: Subject to any disclaimer, the term of this patent is extended or adjusted under 35 U.S.C. 154(b) by 2 days.

(21) Appl. No.: 16/769,147

(22) PCT Filed: Dec. 14, 2018

(86) PCT No.: PCT/JP2018/046096
§ 371 (c)(1),
(2) Date: Jun. 2, 2020

(87) PCT Pub. No.: WO2019/150789
PCT Pub. Date: Aug. 8, 2019

(65) Prior Publication Data
US 2021/0234439 A1 Jul. 29, 2021

(30) Foreign Application Priority Data

Jan. 31, 2018 (JP) .............................. JP2018-014276

(51) Int. Cl.
*H02K 15/00* (2006.01)
*H02K 3/12* (2006.01)
(Continued)

(52) U.S. Cl.
CPC ........... *H02K 15/0031* (2013.01); *H02K 3/12* (2013.01); *H02K 15/0037* (2013.01);
(Continued)

(58) Field of Classification Search
CPC .... H02K 3/12; H02K 15/0068; H02K 15/085; H02K 15/0414; H02K 3/48;
(Continued)

(56) References Cited

U.S. PATENT DOCUMENTS 10,250,093 B2 * 4/2019 Hattori .................... H02K 3/48
2016/0172919 A1 6/2016 Hattori
(Continued)

FOREIGN PATENT DOCUMENTS

JP 2011-120356 A 6/2011
JP 2011-205834 A 10/2011
(Continued)

OTHER PUBLICATIONS

Feb. 26, 2019 Search Report issued in International Patent Application No. PCT/JP2018/046096.
(Continued)

*Primary Examiner* — Thiem D Phan
(74) *Attorney, Agent, or Firm* — Oliff PLC

(57) ABSTRACT

The method for manufacturing an armature includes a step of independently pressing pressing-target segment conductors by a plurality of pressing jigs disposed for each of the pressing-target segment conductors, such that the plurality of pressing jigs are movable relative to each other, at least either one of first segment conductors and second segment conductors serving as the pressing-target segment conductors.

10 Claims, 14 Drawing Sheets

(51) Int. Cl.
*H02K 15/06* (2006.01)
*H02K 15/085* (2006.01)

(52) U.S. Cl.
CPC ......... *H02K 15/064* (2013.01); *H02K 15/085* (2013.01); *Y10T 29/49009* (2015.01)

(58) Field of Classification Search
CPC ......... Y10T 29/49012; Y10T 29/49073; Y10T 29/49009; Y10T 29/53143
USPC .......... 29/596, 597, 598, 606, 843, 850, 871
See application file for complete search history.

(56) References Cited

U.S. PATENT DOCUMENTS

| 2017/0040859 A1 | 2/2017 | Langlard |
| 2017/0133893 A1 | 5/2017 | Bilteryst et al. |

FOREIGN PATENT DOCUMENTS

| JP | 2014-217228 A | 11/2014 |
| JP | 2015-23771 A | 2/2015 |

OTHER PUBLICATIONS

Jan. 19, 2021 Search Report issued in European Patent Application No. 18904106.4.

\* cited by examiner

FIG. 18A
FIG. 18B
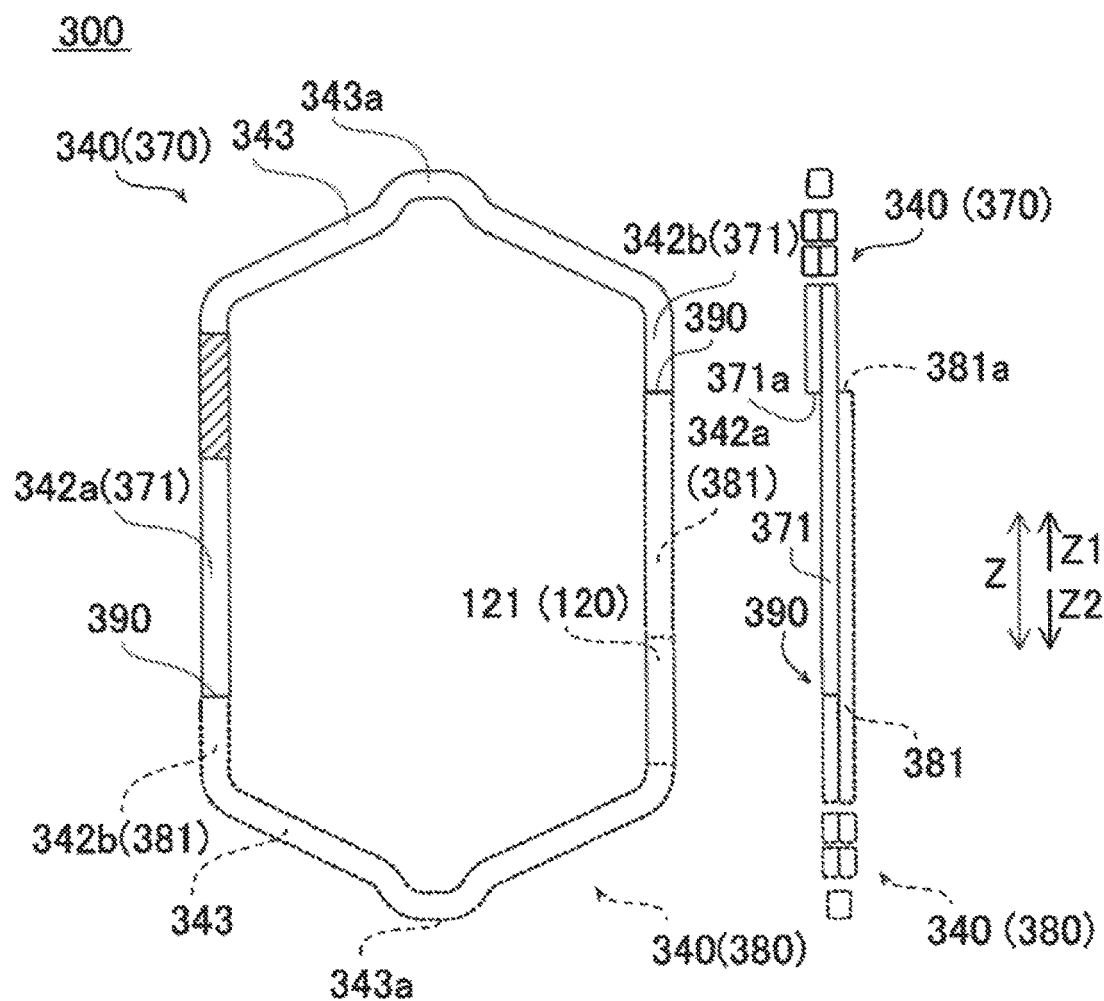
FIG. 19
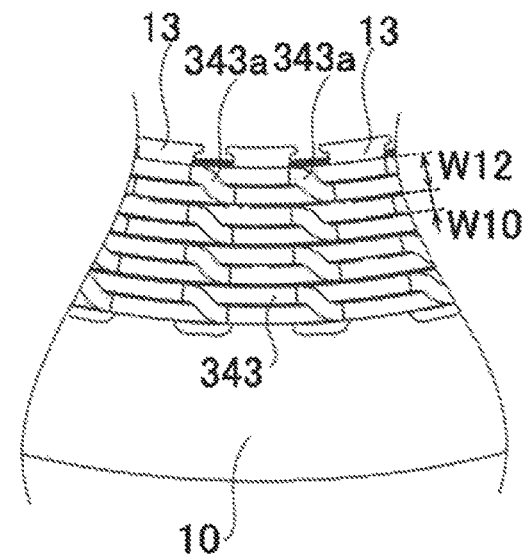

METHOD FOR MANUFACTURING ARMATURE

TECHNICAL FIELD

The preferred embodiment relates to a method for manufacturing an armature and a device for manufacturing an armature.

BACKGROUND ART

Conventionally, there is known an armature including an armature core provided with a plurality of slots extending in a central axis line direction. Such an armature is disclosed in, for example, JP 2015-23771 A.

JP 2015-23771 A discloses a rotating electrical machine stator (hereinafter, referred to as "stator") including a stator core provided with a plurality of slots extending in a central axis line direction (axial direction). The stator includes coils each formed by joining together an end part of a one-side conductor segment which is disposed on one axial side of the stator core and an end part of an other-side conductor segment which is disposed on the other axial side of the stator core. A projecting part is formed at the end part of the one-side conductor segment, and a recessed part is formed at the end part of the other-side conductor segment. A bonding material is disposed between the projecting part and the recessed part, and the one-side conductor segment and the other-side conductor segment are heated while pressed from both axial sides with the projecting part and the recessed part engaged with each other, by which the end part of the one-side conductor segment and the end part of the other-side conductor segment are joined together.

CITATIONS LIST

Patent Literature

Patent Literature 1: JP 2015-23771 A

SUMMARY

Technical Problems

Here, a uniform pressing force to a joint portion is required to improve the quality of a joint between the one-side conductor segment and the other-side conductor segment. It can be assumed, though JP 2015-23771 A does not explicitly describe, that upon pressing the one-side conductor segment and the other-side conductor segment from both axial sides, portions (coil end parts) of the one-side conductor segment and the other-side conductor segment on the outer axial sides of the stator core (slot) are axially pressed. Note that there is a case in which due to manufacturing error of segment conductors, the height positions of coil end parts in the central axis line direction are not uniform (vary). In this case, for example, when a plurality of coil end parts that vary in their height positions are pressed simultaneously (at the same time) by a flat-surface-shaped pressing jig, a sufficient pressing force is not applied to some of a plurality of segment conductors (specifically, segment conductors having coil end parts with low height positions). Hence, there is a problem that it is difficult to improve the quality of a joint between a one-side conductor segment (first segment conductor) and an other-side conductor segment (second segment conductor).

Preferred embodiments are directed to solve a problem such as that described above, and provides a method for manufacturing an armature and a device for manufacturing an armature that can improve the quality of a joint between a first segment conductor and a second segment conductor in a slot.

Solutions to Problems

To provide the above-described method, a method for manufacturing an armature of one aspect of a preferred embodiment is a method for manufacturing an armature including an armature core provided with a plurality of slots extending in a central axis line direction; and a coil part including a plurality of segment conductors having leg parts extending in the central axis line direction, the plurality of leg parts being joined together, and the method includes a step of disposing, in the plurality of slots, both of first leg parts of first segment conductors disposed on one side in a central axis line direction of the armature core among the plurality of segment conductors and second leg parts of second segment conductors disposed on an other side in a central axis line direction of the armature core; and a joining step of joining together the first segment conductors and the second segment conductors disposed in the plurality of slots, and the joining step includes a step of independently pressing pressing-target segment conductors by a plurality of pressing jigs disposed for each of the pressing-target segment conductors, such that the plurality of pressing jigs are movable relative to each other, at least either one of the first segment conductors and the second segment conductors disposed in the plurality of slots serving as the pressing-target segment conductors.

The method for manufacturing an armature a preferred embodiment includes, as described above, a step of independently pressing pressing-target segment conductors by a plurality of pressing jigs disposed for each of the pressing-target segment conductors, such that the plurality of pressing jigs are movable relative to each other. By this, even when there are variations in the positions of pressing-target segment conductors with respect to the slots due to manufacturing error of first segment conductors and second segment conductors, since the pressing-target segment conductors are independently pressed, a sufficient pressing force can be applied to the pressing-target segment conductors. As a result, the quality of joints between the first segment conductors and the second segment conductors can be improved.

A device for manufacturing an armature of a second preferred embodiment is a device for manufacturing an armature including an armature core provided with a plurality of slots extending in a central axis line direction; and a coil part including a plurality of segment conductors having leg parts extending in the central axis line direction, the plurality of leg parts being joined together, and the device includes a plurality of pressing jigs disposed for each of pressing-target segment conductors, and independently pressing the pressing-target segment conductors so as to be movable relative to each other, at least either one of first segment conductors and second segment conductors serving as the pressing-target segment conductors, the first segment conductors being disposed on one side in a central axis line direction of the armature core among the plurality of segment conductors, the second segment conductors being disposed on an other side in a central axis line direction of the armature core, and the first segment conductors and the second segment conductors being disposed in the plurality of slots; and movement mechanism parts that allow the plurality of pressing jigs to move.

The device for manufacturing an armature of the second preferred embodiment includes, as described above, a plurality of pressing jigs disposed for each of pressing-target segment conductors, and independently pressing the pressing-target segment conductors so as to be movable relative to each other, at least either one of second segment conductors serving as the pressing-target segment conductors, the second segment conductors being disposed on the other side in a central axis line direction of the armature core. By this, even when there are variations in the positions of pressing-target segment conductors with respect to the slots due to manufacturing error of first segment conductors and second segment conductors, since the pressing-target segment conductors are independently pressed, a sufficient pressing force can be applied to the pressing-target segment conductors. As a result, a device for manufacturing an armature that can improve the quality of joints between the first segment conductors and the second segment conductors can be provided.

Advantages

According to the preferred embodiment, as described above, the quality of joints between first segment conductors and second segment conductors in slots can be improved.

BRIEF DESCRIPTION OF DRAWINGS

FIG. 8 is a transverse cross-sectional view showing a configuration of a segment conductor of the first embodiment of the preferred embodiment.

FIG. 9 is a diagram showing a configuration of a general conductor of the first embodiment of the preferred embodiment.

FIG. 18 is a diagram showing a configuration of a general conductor of a second embodiment of the preferred embodiment, and FIG. 18A is a front view and FIG. 18B is a side view.

FIG. 19 is a top view showing a configuration of segment conductors (crank portions) of the second embodiment of the preferred embodiment.

DESCRIPTION OF EMBODIMENTS

A first embodiment of the preferred embodiment will be described below based on the drawings.

First Embodiment (Structure of a Stator)

With reference to FIGS. 1 to 11, a structure of a stator 100 of a first embodiment will be described. The stator 100 has an annular shape having a central axis line C1 at the center. Note that the stator 100 is an example of an "armature" in the claims.

Figure 1:
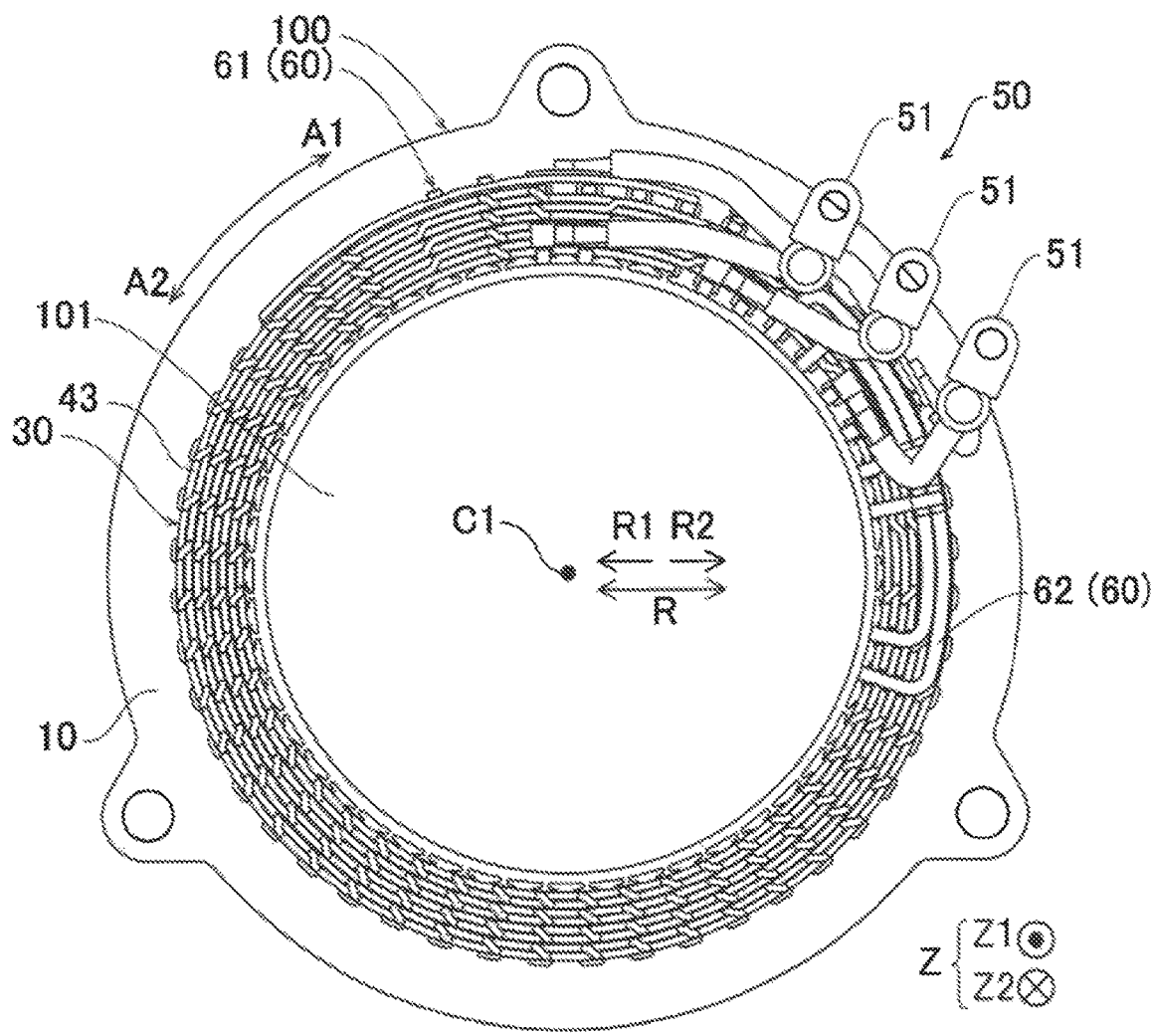
FIG. 1 is a plan view showing a configuration of a stator (rotating electrical machine) of a first embodiment of the preferred embodiment.

In the specification of the present application, an "axial direction (central axis line direction)" indicates, as shown in FIG. 1, a direction (Z-direction) along the central axis line C1 of the stator 100 (a rotation axis line of a rotor 101). In addition, a "circumferential direction" indicates a circumferential direction (A-direction) of the stator 100. In addition, a "radial direction" indicates a radial direction (R-direction) of the stator 100. In addition, a "radial inner side" indicates a direction (R1-direction) going toward the central axis line C1 of the stator 100. In addition, a "radial outer side" indicates a direction (R2-direction) going toward the outside of the stator 100.

The stator 100 together with the rotor 101 forms a part of a rotating electrical machine 102. The rotating electrical machine 102 is constructed as, for example, a motor, a generator, or a motor-generator. As shown in FIG. 1, the stator 100 is disposed on the radial outer side of the rotor 101 having permanent magnets (not shown) provided thereon. Namely, in the first embodiment, the stator 100 forms a part of the inner-rotor rotating electrical machine 102.

Figure 2:
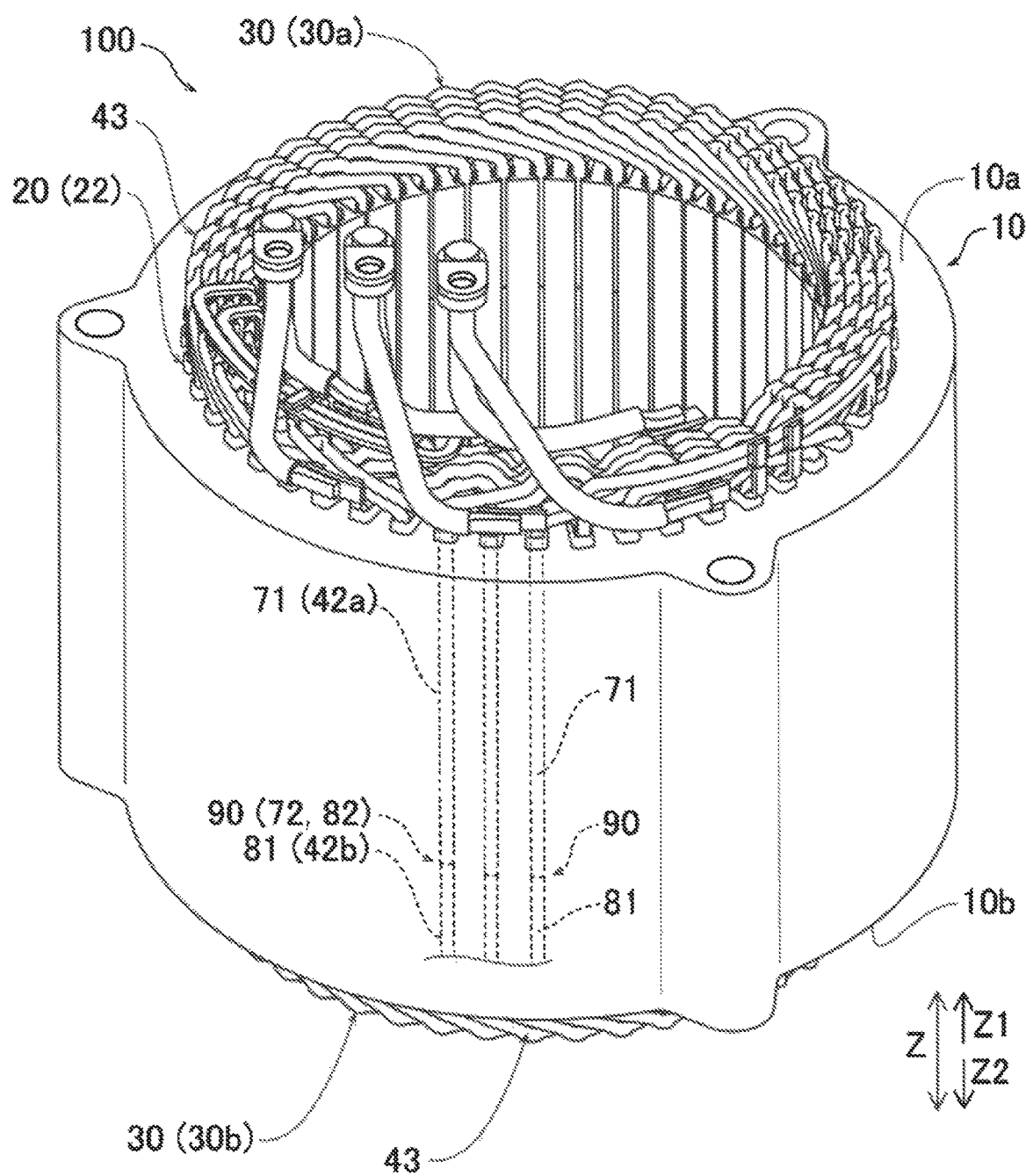
FIG. 2 is a perspective view showing a configuration of the stator of the first embodiment of the preferred embodiment.
Figure 3:
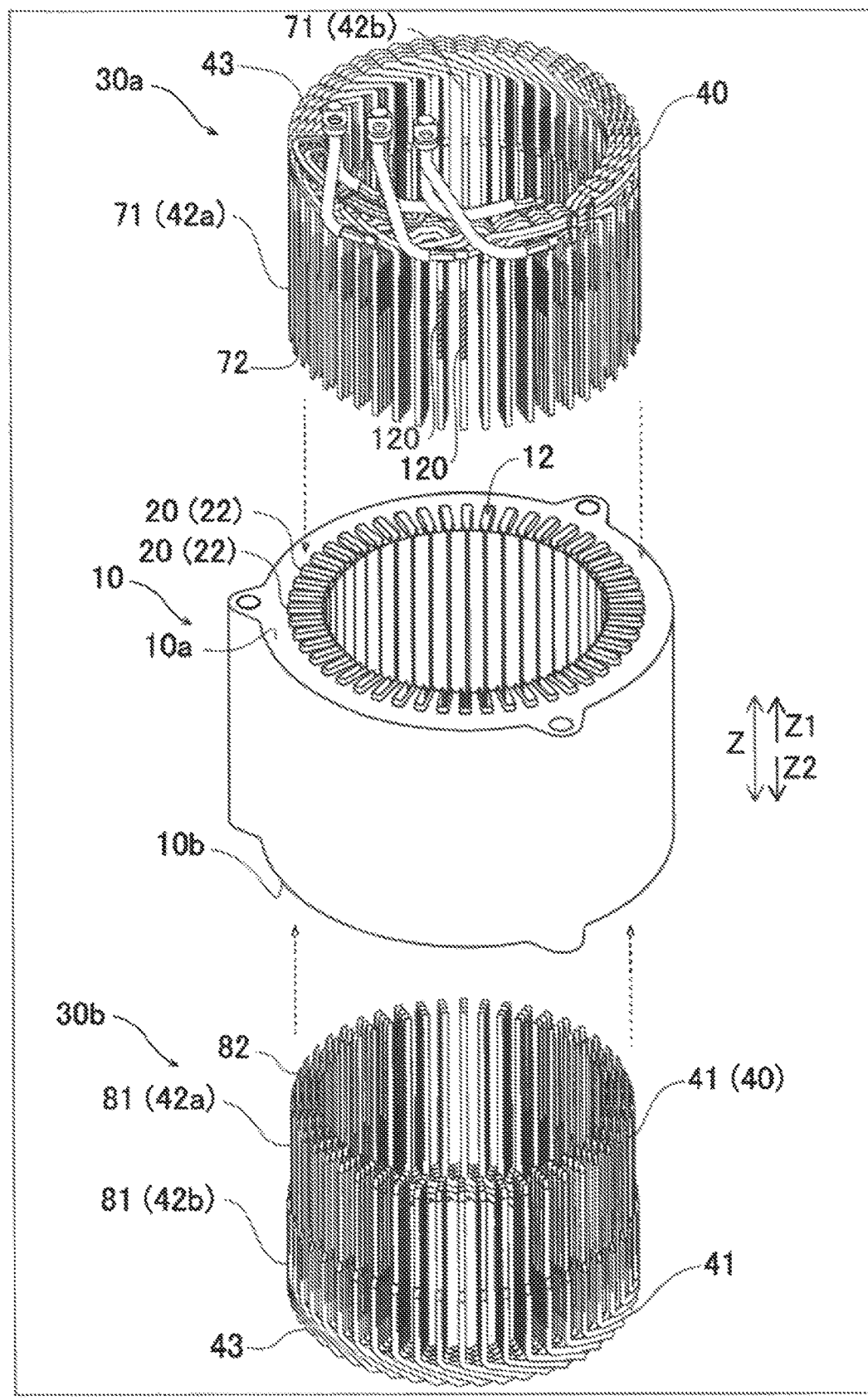
FIG. 3 is an exploded perspective view of the stator of the first embodiment of the preferred embodiment.

As shown in FIG. 2, the stator 100 includes a stator core 10, insulating members 20, and a coil part 30. In addition, as shown in FIG. 3, the coil part 30 includes a first coil assembly 30a and a second coil assembly 30b. In addition, the coil part 30 includes a plurality of segment conductors 40. Note that the stator core 10 is an example of an "armature core" in the claims.

(Structure of the Stator Core)

Figure 4:
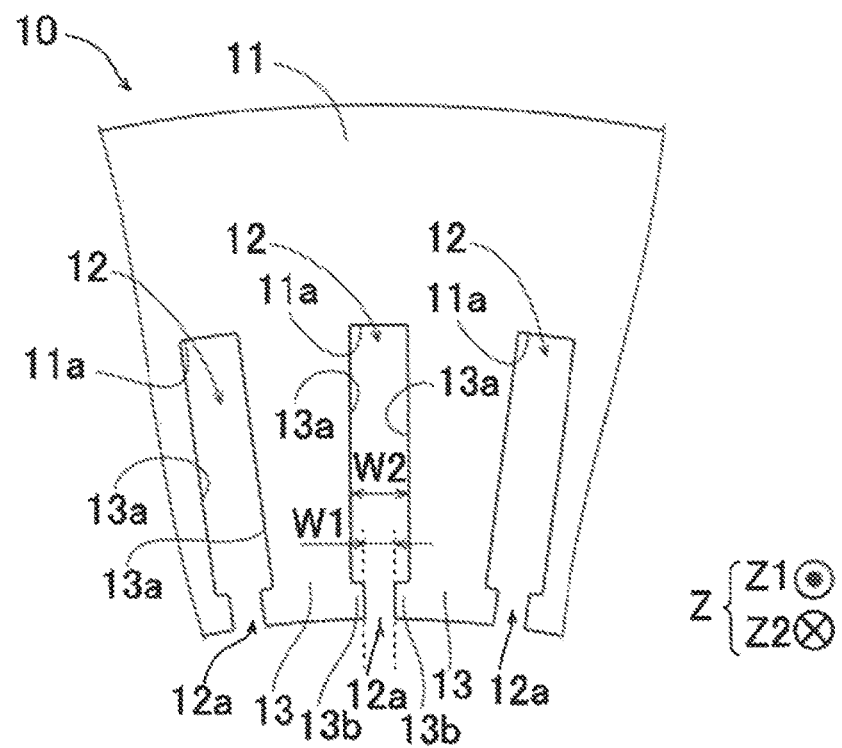
FIG. 4 is a plan view showing a configuration of a stator core of the first embodiment of the preferred embodiment.

The stator core 10 has a cylindrical shape having the central axis line C1 (see FIG. 1) as its central axis. In addition, the stator core 10 is constructed by, for example, axially stacking a plurality of electromagnetic steel sheets (e.g., silicon steel sheets). As shown in FIG. 4, the stator core 10 is provided with a back yoke 11 having an annular shape as viewed in the axial direction; and a plurality of slots 12 provided on the radial inner side of the back yoke 11 and extending axially. The stator core 10 is provided with a plurality of teeth 13 on both circumferential sides of the slots 12. Note that the back yoke 11 is an example of a "yoke part" in the claims.

Each slot 12 is a portion surrounded by a wall part 11a of the back yoke 11 that is provided more on the radial outer side than a first other end surface 73 which will be described later, and circumferential side surfaces 13a of two teeth 13. The slot 12 is provided with an opening part 12a that is provided more on the radial inner side than a second one end surface 84 which will be described later and that opens on the radial inner side. In addition, the slot 12 opens on both axial sides. Each tooth 13 is formed so as to protrude from the back yoke 11 toward the radial inner side, and has projecting parts 13b formed at its end part on the radial inner side, the projecting parts 13b forming opening parts 12a of slots 12.

Each opening part 12a has an opening width W1 in the circumferential direction. Here, the opening width W1 corresponds to a distance between end parts of projecting parts 13b of teeth 13. In addition, a width W2 of a portion of a slot 12 where the coil part 30 and an insulating member 20 are disposed is larger than the opening width W1. Namely, the slot 12 is constructed as a semi-open slot. Here, the width W2 corresponds to a distance between circumferential side surfaces 13a of teeth 13 disposed on both circumferential sides of the slot 12. In addition, the width W2 of the slot 12 is substantially constant in the radial direction.

(Structure of the Insulating Members)

Figure 5:
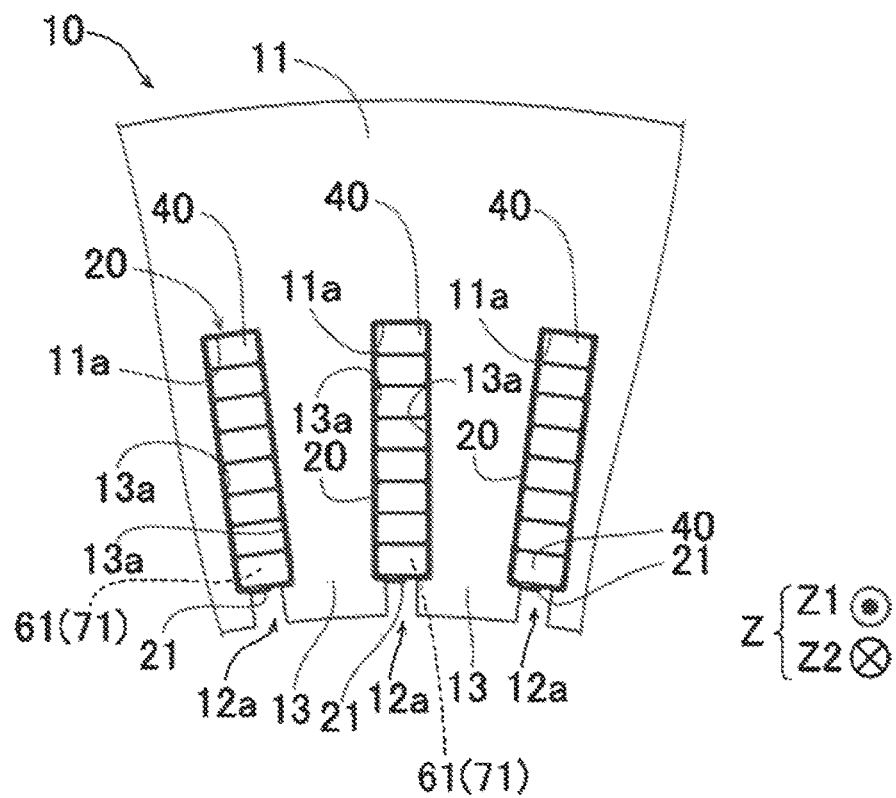
FIG. 5 is a cross-sectional view showing a configuration of insulating members of the first embodiment of the preferred embodiment.

As shown in FIG. 5, each insulating member 20 is disposed between teeth 13 and segment conductors 40. The insulating member 20 includes a joint-part covering part 21. The joint-part covering part 21 is configured to cover at least the radial inner side of a joint part 90 which will be described later of a segment conductor 40 disposed on a side closest to an opening part 12a of a slot 12 among a plurality of segment conductors 40 parallelly and radially arranged.

Specifically, the insulating members 20 are made of, for example, sheet-like insulating members such as aramid paper and polymer films, and have a function of securing insulation between the segment conductors 40 (the coil part 30) and the stator core 10. Each insulating member 20 is disposed between segment conductors 40 and circumferential side surfaces 13a of teeth 13 and between one of the plurality of segment conductors 40 that is disposed on the radially outermost side and a wall part 11a. In addition, as shown in FIG. 3, each insulating member 20 includes collar parts 22 (cuff parts) formed so as to protrude from a slot 12 toward the axial outer side on both axial sides and to be folded back.

Each insulating member 20 is disposed so as to entirely cover the circumference of a plurality of segment conductors 40 parallelly and radially arranged as viewed in an arrow "Z2" direction. In other words, both circumferential sides and both radial sides of held-in-slot parts 42a and 42b (described later) of the plurality of segment conductors 40 parallelly and radially arranged are covered by the insulating member 20. By this, it becomes possible to secure insulation between the joint parts 90 and the stator core 10 by the insulating members 20. Note that the held-in-slot parts 42a and 42b are an example of "leg parts" in the claims.

(Structure of the Coil Part)

As shown in FIGS. 2 and 3, the coil part 30 is formed by combining and joining together the first coil assembly 30a provided on one axial side (an arrow "Z1" direction side) and the second coil assembly 30b provided on the other axial side (an arrow "Z2" direction side). The first coil assembly 30a and the second coil assembly 30b each are formed in annular shape having the same central axis line C1 as the stator coil 10 (see FIG. 1) at the center.

The coil part 30 is constructed as, for example, wave-winding coils. In addition, the coil part 30 is constructed as 8-turn coils. Namely, as shown in FIG. 5, the coil part 30 is configured such that eight segment conductors 40 are parallelly and radially arranged in each slot 12. The coil part 30 is configured such that by supplying three-phase alternating-current power to the coil part 30 from a power supply part (not shown), a magnetic flux is generated while current axially moves back and forth and circumferentially flows.

<Configuration of Connection of the Coil Part>

Figure 6:
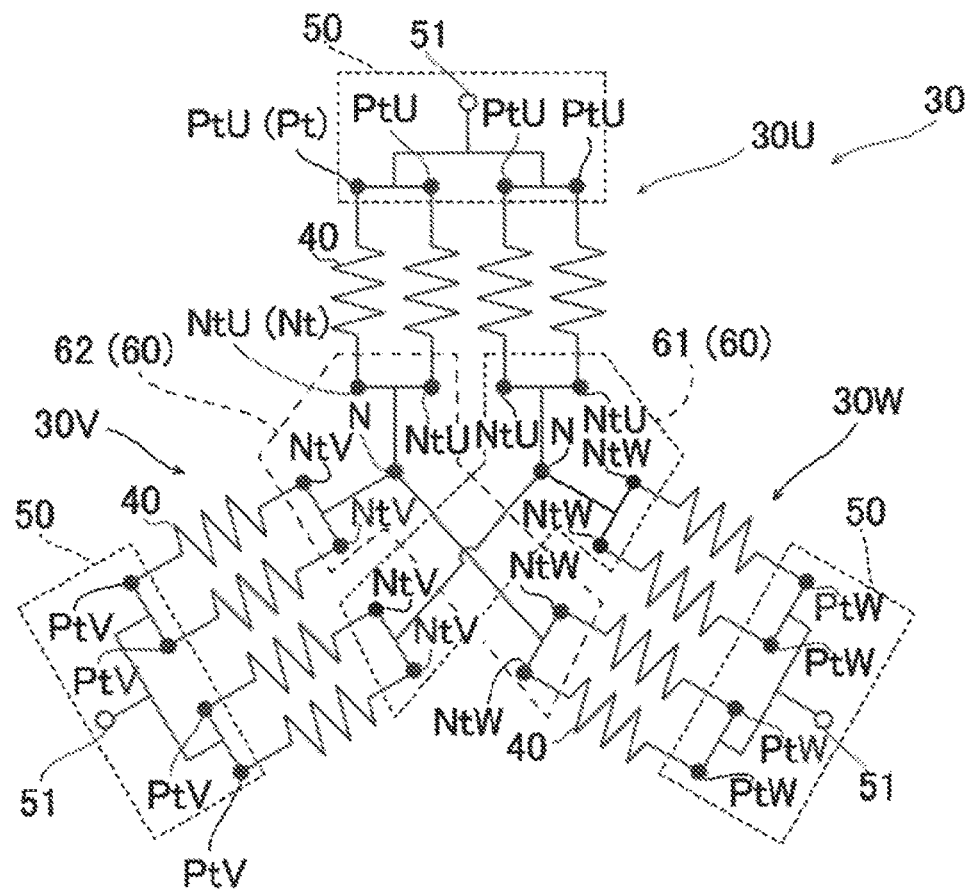
FIG. 6 is a circuit diagram showing a connection configuration of a coil part of the first embodiment of the preferred embodiment.

As shown in FIG. 6, the coil part 30 is connected using three-phase "Y" connection. Namely, the coil part 30 includes a U-phase coil part 30U, a V-phase coil part 30V, and a W-phase coil part 30W. For example, the coil part 30 is provided with a plurality of neutral points N. Specifically, the coil part 30 is four parallel-connected (star-connected). Namely, the U-phase coil part 30U is provided with four neutral-point connection end parts NtU and four power-line connection end parts PtU. The V-phase coil part 30V is provided with four neutral-point connection end parts NtV and four power-line connection end parts PtV. The W-phase coil part 30W is provided with four neutral-point connection end parts NtW and four power-line connection end parts PtW. Note that in the following description when the neutral-point connection end parts and the power-line connection end parts for the U-phase, the V-phase, and the W-phase are not particularly distinguished from each other, they are simply described as "neutral-point connection end parts Nt" and "power-line connection end parts Pt".

<Structure of the Coil Assemblies>

Figure 7:
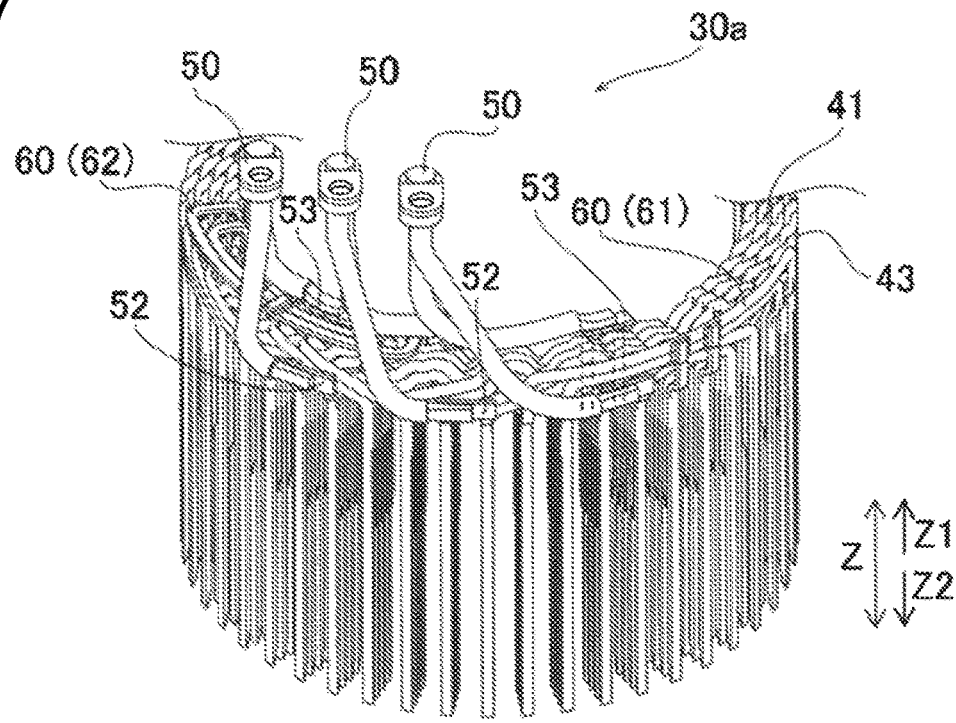
FIG. 7 is a perspective view showing a part of a first coil assembly of the first embodiment of the preferred embodiment.

As shown in FIG. 7, the first coil assembly 30a includes a plurality of (e.g., three) segment conductors for power-line connection 50 (hereinafter, referred to as "power conductors 50") which are segment conductors 40; a plurality of (e.g., two) segment conductors for neutral point connection 60 (hereinafter, referred to as "neutral point conductors 60") which are segment conductors 40; and a plurality of general conductors 41 which are conductors (general segment conductors 40) differing from the power conductors 50 and the neutral point conductors 60 among the plurality of segment conductors 40, and which form the coil part 30.

As shown in FIG. 3, the second coil assembly 30b includes a plurality of general conductors 41. Preferably, the second coil assembly 30b includes only a plurality of general conductors 41, and all of the power conductors 50 and the neutral point conductors 60 provided in the stator 100 are provided in the first coil assembly 30a.

(Structure of the Segment Conductors)

Figure 8A:
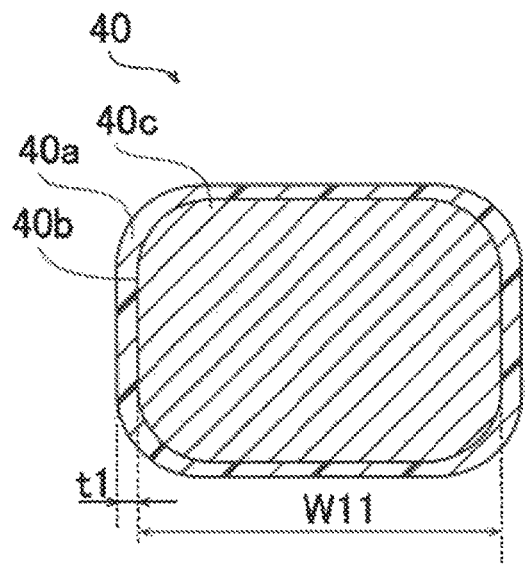
FIG. 8A is a diagram showing an insulating film and FIG. 8B is a diagram showing an insulating member.

As shown in FIG. 8(a), each segment conductor 40 is constructed as a rectangular conducting wire whose transverse section has a substantially rectangular shape. An insulating film 40a having a thickness t1 is provided on a conductor surface 40b of the segment conductor 40. The thickness t1 of the insulating film 40a is set to such a thickness, for example, that allows to secure phase-to-phase insulation performance (insulation between coil end parts 43). In addition, a conductor main body 40c of the segment conductor 40 is made of, for example, a metal material (conductive material) such as copper or aluminum. Note that although in FIG. 8 a magnitude relationship such as thicknesses is shown emphasized for the sake of description, the configuration is not limited to the example shown in the drawing.

Figure 9A:
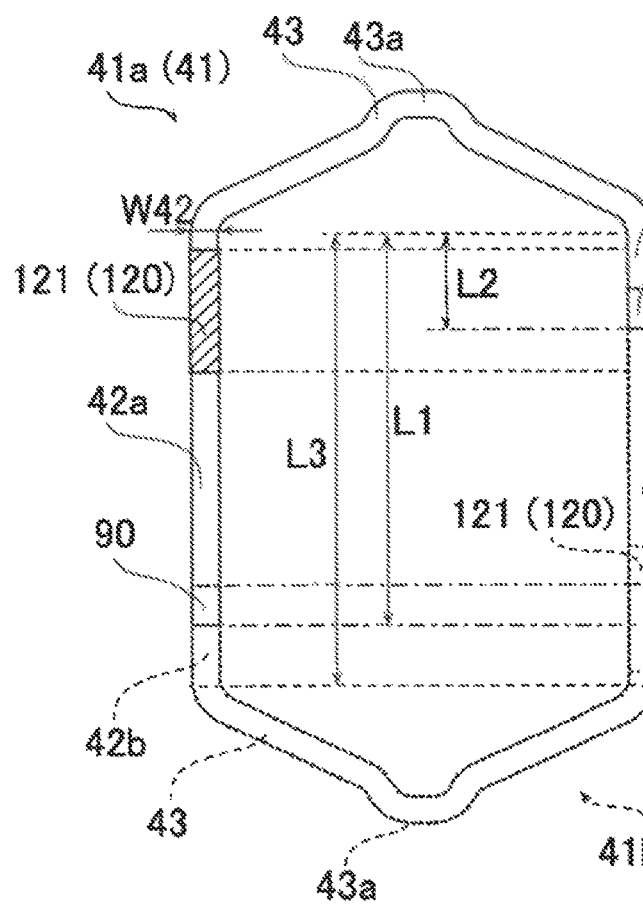
FIG. 9A is a front view and FIG. 9B is a side view.
Figure 9B:
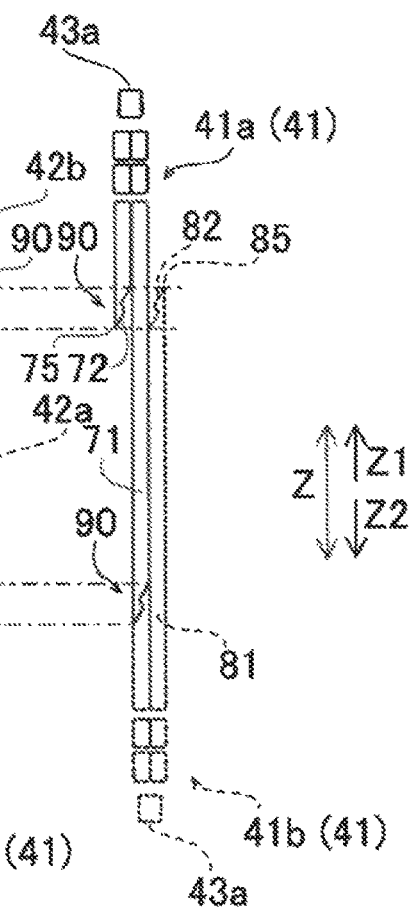

As shown in FIG. 9, a segment conductor 40 includes held-in-slot parts 42a and 42b which are disposed in slots 12; and a coil end part 43. The held-in-slot parts 42a and 42b indicate portions that are disposed in slots 12 from an axial position of an end surface 10a or 10b of the stator core 10, and the coil end part 43 indicates a portion that is formed continuing to the held-in-slot parts 42a and 42b and is disposed more on the axial outer side than the end surface 10a or 10b of the stator core 10. In addition, the coil end part 43 has a bent shape that axially bends. In addition, the coil end part 43 has a crank portion 43a formed in crank shape that radially bends in a stepwise manner for an amount corresponding to the width of a single segment conductor 40 as viewed in the axial direction. That is, the radial width of the crank portion 43a is double the width of a single segment conductor 40. Note that the crank portion 43a is an example of a "top part" in the claims.

<Structure of the General Conductors>

As shown in FIG. 9, each general conductor 41 includes a pair of held-in-slot parts 42a and 42b disposed in different slots 12; and a coil end part 43 that connects the pair of held-in-slot parts 42a and 42b. By this, the general conductor 41 has a substantially U-shape or a substantially J-shape as viewed from the radial inner side. The held-in-slot parts 42a and 42b are linearly and axially formed. Note that held-in-slot parts 42a and 42b of the power conductors 50 and held-in-slot parts 42a and 42b of the neutral point conductors 60 are configured in the same manner as the held-in-slot parts 42a and 42b of the general conductors 41, and thus, description thereof is omitted.

Here, the coil pitch of the general conductors 41 is six. Namely, a pair of held-in-slot parts 42a and 42b are disposed at different circumferential locations corresponding to six slots 12. Namely, five slots are provided between a slot 12 in which a held-in-slot part 42a of a general conductor 41 is disposed and a slot 12 in which a held-in-slot part 42b is disposed.

In addition, the pair of held-in-slot parts 42a and 42b have different axial lengths. Specifically, an axial length L1 of the held-in-slot part 42a is larger than an axial length L2 of the held-in-slot part 42b. Note that the axial length L1 (L2) of the held-in-slot part 42a (42b) indicates the length from an end 75 (85) to an axial position corresponding to the axial end surface 10a (10b) of the stator core 10. In addition, the axial lengths L1 and L2 are smaller than an axial length L3 of the stator core 10. Note that the axial length L3 of the stator core 10 indicates a distance (space) between the axial end surfaces 10a and 10b. For example, the axial length L1 is larger than one-half of the axial length L3, and the axial length L2 is smaller than one-half of the axial length L3.

In addition, the plurality of general conductors 41 include one-side general conductors 41a that are disposed on one axial side (the arrow "Z1" direction side) of the stator core 10 and included in the first coil assembly 30a; and other-side general conductors 41b that are disposed on the other axial side (the arrow "Z2" direction side) of the stator core 10 and included in the second coil assembly 30b.

(Configuration of the Joint Parts)

Figure 10:
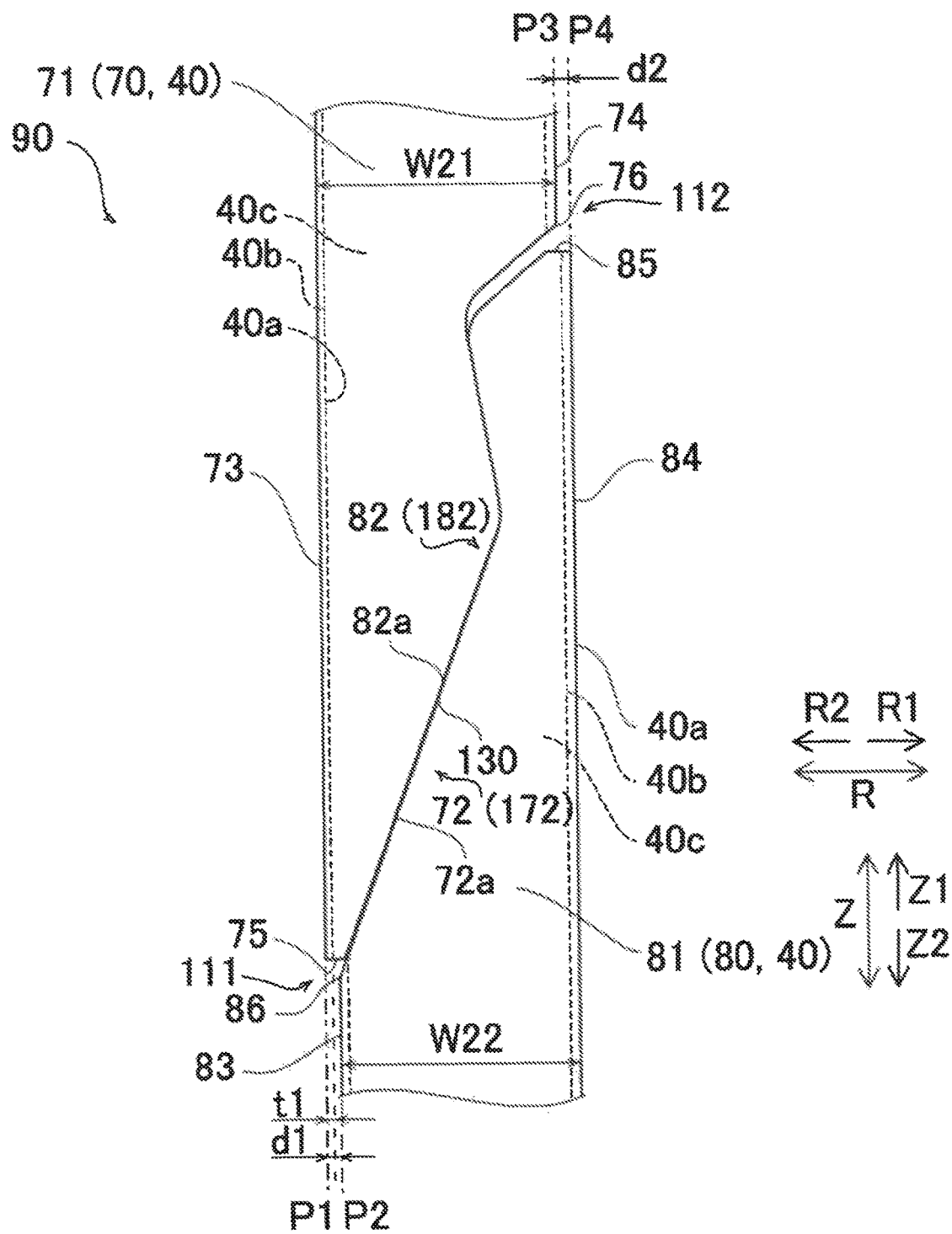
FIG. 10 is a cross-sectional view showing configurations of a first facing surface and a second facing surface of the first embodiment of the preferred embodiment.

As shown in FIG. 10, in a slot 12 of the stator core 10, a first held-in-slot part 71 which is a held-in-slot part 42a or 42b of a first segment conductor 70 which is a segment conductor 40 included in the first coil assembly 30a among the plurality of segment conductors 40 and a second held-in-slot part 81 which is a held-in-slot part 42a or 42b of a second segment conductor 80 which is a segment conductor 40 included in the second coil assembly 30b and axially facing the first segment conductor 70 are joined together at a joint part 90.

The first held-in-slot part 71 includes a first facing surface 72 facing the radial inner side (an arrow "R1" direction side) and facing the second held-in-slot part 81; and a first other end surface 73 facing the radial outer side (an arrow "R2" direction side). In addition, the second held-in-slot part 81 includes a second facing surface 82 facing the radial outer side and facing the first facing surface 72; and a second other end surface 83 facing the radial outer side and continuing to the second facing surface 82. At least a part of the first facing surface 72 and at least a part of the second facing surface 82 are joined together, and the first other end surface 73 is disposed so as to protrude more on the radial outer side than the second other end surface 83.

In addition, the first held-in-slot part 71 includes a first one end surface 74 provided on a radially opposite side of the first other end surface 73 and continuing to the first facing surface 72. The second held-in-slot part 81 includes a second one end surface 84 provided on a radially opposite side of the second other end surface 83 and facing the radial inner side. The second one end surface 84 is disposed so as to protrude more on the radial inner side than the first one end surface 74.

Here, the joint part 90 is a portion of the coil part 30 shown in FIG. 10, and is a portion including the first facing surface 72 and the second facing surface 82 and including a portion from an end 75 of the first held-in-slot part 71 to a boundary point 76 between the first facing surface 72 and the first one end surface 74 and a portion from an end 85 of the second held-in-slot part 81 to a boundary point 86 between the second facing surface 82 and the second other end surface 83.

An other step part 111 is formed between the end 75 of the first held-in-slot part 71 which is a boundary portion between the first other end surface 73 and the second other end surface 83, and the boundary point 86 of the second held-in-slot part 81. In addition, a one step part 112 is formed between the boundary point 76 of the first held-in-slot part 71 which is a boundary portion between the first one end surface 74 and the second one end surface 84, and the end 85 of the second held-in-slot part 81. Specifically, at the other step part 111, a step is formed so as to be recessed toward the inner side of the segment conductor 40 from the first other end surface 73 to the second other end surface 83. In addition, at the one step part 112, a step is formed so as to be recessed toward the inner side of the segment conductor 40 from the second one end surface 84 to the first one end surface 74.

In addition, a first displacement width d1 which is a displacement width between a position P1 in the radial direction of the first other end surface 73 and a position P2 in the radial direction of the second other end surface 83 is greater than, for example, the thickness t1 of the insulating film 40a of the segment conductor 40. Note that the magnitude of the first displacement width d1 corresponds to the height of the step at the other step part 111.

Specifically, the first displacement width d1 is set to such a width that even when the first held-in-slot part 71 or the second held-in-slot part 81 is elastically deformed when the first held-in-slot part 71 or the second held-in-slot part 81 is pressed by a pressing jig 201 which will be described later and a wall part 11a, the segment conductor 40 is not pressed in a direction in which the first facing surface 72 and the second facing surface 82 are separated from each other, or such a width that a pressing force is reduced.

Figure 11:
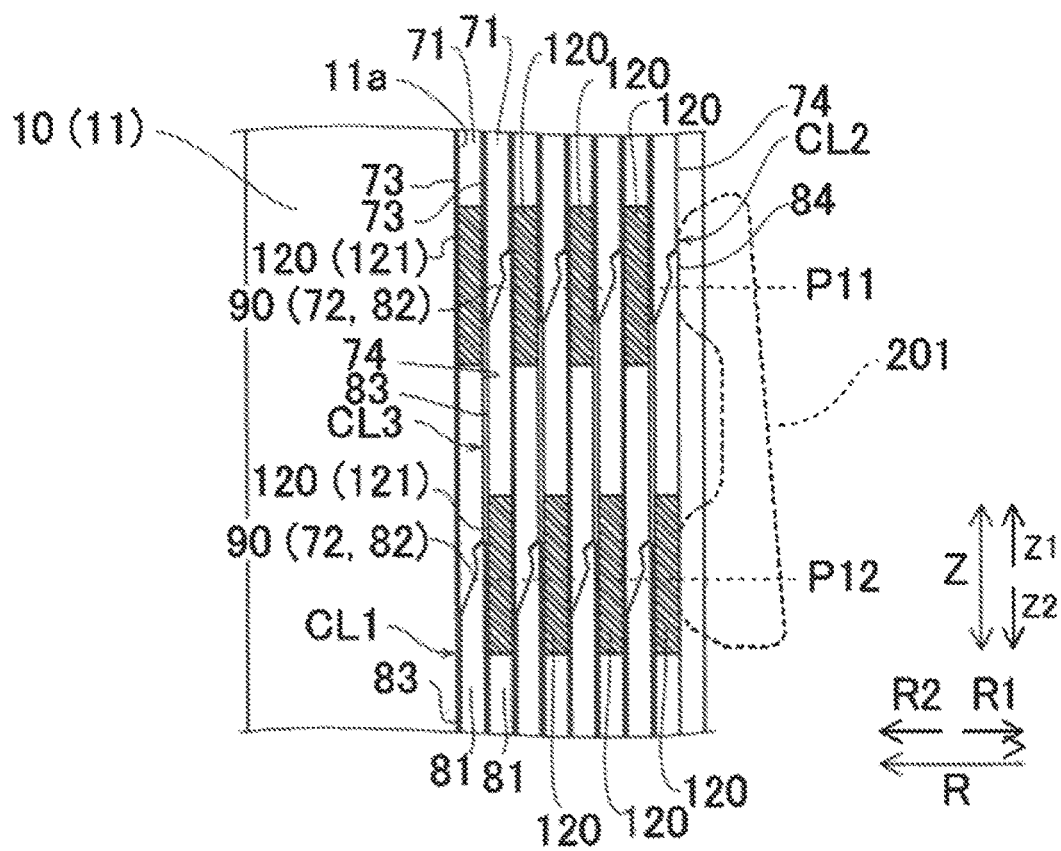
FIG. 11 is a cross-sectional view showing disposition locations of insulating members and joint parts of the first embodiment of the preferred embodiment.

For example, as shown in FIG. 11, clearance CL1 is radially made between a wall part 11a and a second other end surface 83 of a second held-in-slot part 81 disposed on the radially outermost side. In addition, upon manufacturing the stator 100, clearance CL2 is radially made between a pressing jig 201 and a first one end surface 74 of a first held-in-slot part 71 disposed on the radially innermost side.

In addition, as shown in FIG. 10, the first displacement width d1 is equal to a second displacement width d2 which is a displacement width between a position P3 in the radial direction of the first one end surface 74 and a position P4 in the radial direction of the second one end surface 84 (the height of the step at the one step part 112). Namely, a width W21 in the radial direction of the first held-in-slot part 71 is substantially equal to a width W22 in the radial direction of the second held-in-slot part 81. In addition, the first held-in-slot part 71 is disposed so as to be displaced toward the radial outer side relative to the second held-in-slot part 81.

As shown in FIG. 11, a plurality of (e.g., eight) first held-in-slot parts 71 and a plurality of (e.g., eight) second held-in-slot parts 81 are disposed in a slot 12 so as to be radially adjacent to each other. Namely, the plurality of first held-in-slot parts 71 are parallelly and radially arranged and the plurality of second held-in-slot parts 81 are parallelly and radially arranged.

In the slot 12, one of the first facing surfaces 72 (joint parts 90) of the plurality of first held-in-slot parts 71 is disposed at a different axial location than another first facing surface 72 (joint part 90) radially adjacent thereto. In addition, in the slot 12, one of the second facing surfaces 82 of the plurality of second held-in-slot parts 81 is disposed at a different axial location than another second facing surface 82 radially adjacent thereto. Namely, an axial position P11 of a joint part 90 including a first facing surface 72 and a second facing surface 82 is a different position from an axial position P12 of a joint part 90 including a first facing surface 72 and a second facing surface 82 and radially adjacent to the joint part 90.

In other words, the first held-in-slot parts 71 and the second held-in-slot parts 81 are radially staggered in the axial positions P11 and P12. In each of the plurality of joint parts 90, the first other end surface 73 is disposed (offset) so as to protrude toward more radial outer side than a corresponding second other end surface 83. In addition, in each of the plurality of joint parts 90, the second one end surface 84 is disposed (offset) so as to protrude toward more radial inner side than a corresponding first one end surface 74. By this, radial clearance CL3 is radially made between the first one end surface 74 and the second other end surface 83.

<Configuration of Insulating Parts>

In addition, as shown in FIG. 11, the coil part 30 is provided with insulating parts 120. One segment conductor 40 among a plurality of segment conductors 40 parallelly arranged is provided with an insulating part 120 on its conductor surface 40b (see FIG. 8(b)) at an axial location corresponding to a joint part 90 of another segment conductor 40 disposed radially adjacent thereto (hereinafter, this joint part 90 is referred to as "adjacent joint part 90"), the insulating part 120 having a thickness t2 larger than the thickness t1 of the insulating film 40a of the adjacent joint part 90.

(Device for Manufacturing the Stator)

Figure 12:
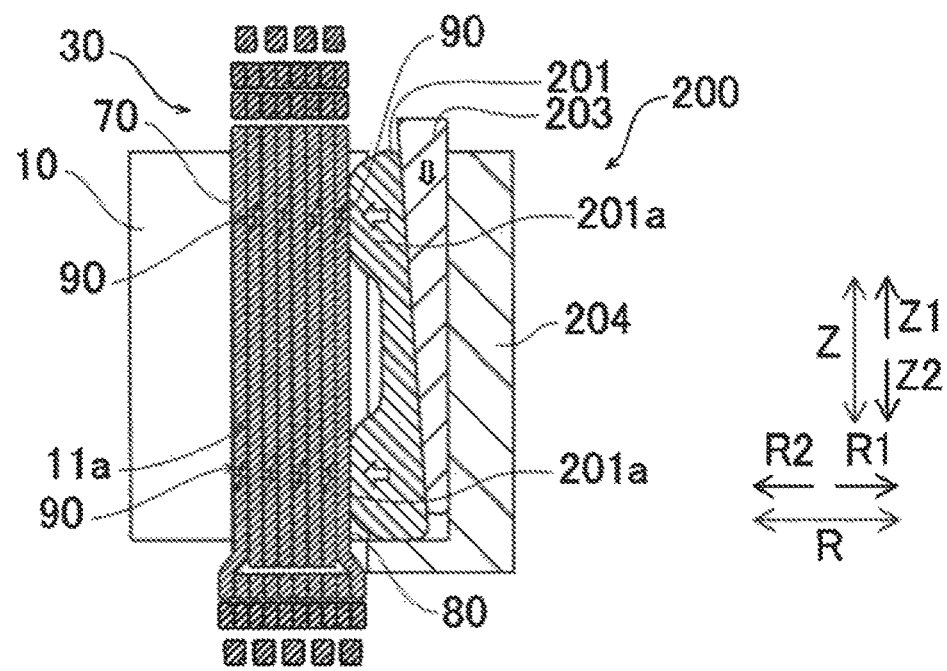
FIG. 12 is a cross-sectional view showing a device for manufacturing the stator (a radial cross-sectional view for describing a step of pressing segment conductors by a pressing jig and a wall part) of the first embodiment of the preferred embodiment.
Figure 13:
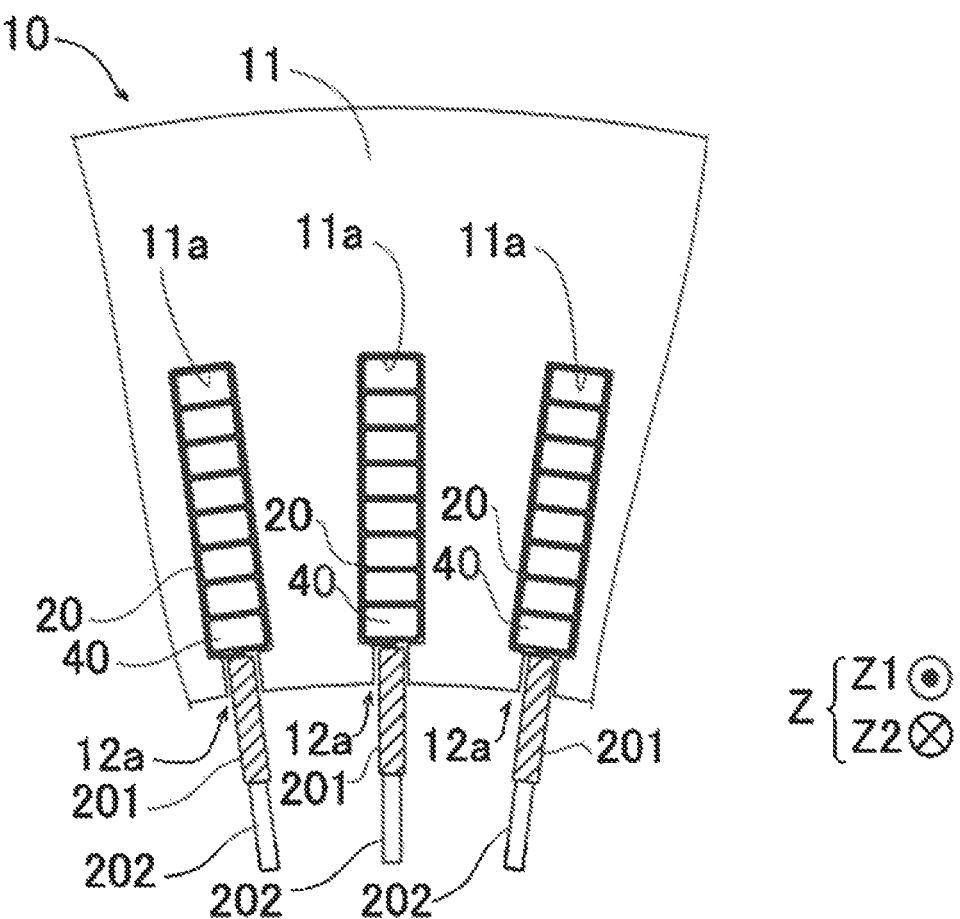
FIG. 13 is a plane cross-sectional view showing the device for manufacturing the stator (a plane cross-sectional view for describing a step of pressing segment conductors by pressing jigs and wall parts) of the first embodiment of the preferred embodiment.

Next, a device 200 for manufacturing the stator 100 will be described. In the first embodiment, as shown in FIG. 12, the device 200 for manufacturing the stator 100 includes pressing jigs 201. The pressing jigs 201 independently press at least either one (both in the first embodiment) of first held-in-slot parts 71 of first segment conductors 70 and second held-in-slot parts 81 of second segment conductors 80 which are disposed in the plurality of slots 12, so as to be movable relative to each other. Specifically, the pressing jigs 201 independently and radially press both the first held-in-slot parts 71 and the second held-in-slot parts 81 which are disposed in the plurality of slots 12, on a per slot 12 basis. Note that the first held-in-slot parts 71 and the second held-in-slot parts 81 are an example of "pressing-target segment conductors" in the claims. Specifically, as shown in FIG. 13, the pressing jigs 201 are disposed for each of the plurality of slots 12 and configured to be radially movable. In addition, a plurality (the same number as the number of the slots 12) of pressing jigs 201 are provided so as to be available for the plurality of slots 12, and configured to be independently and radially movable on a per pressing jig 201 basis. Note that the pressing jigs 201 are an example of "first pressing jigs" in the claims.

In addition, in the first embodiment, the device 200 for manufacturing the stator 100 includes movement mechanism parts 202 that allow the pressing jigs 201 to independently move on a per slot 12 basis. The movement mechanism parts 202 are provided for each of the plurality of pressing jigs 201, and configured to be able to adjust the amount of radial movement on a per pressing jig 201 basis. The movement mechanism parts 202 are composed of, for example, actuators.

Figure 14:
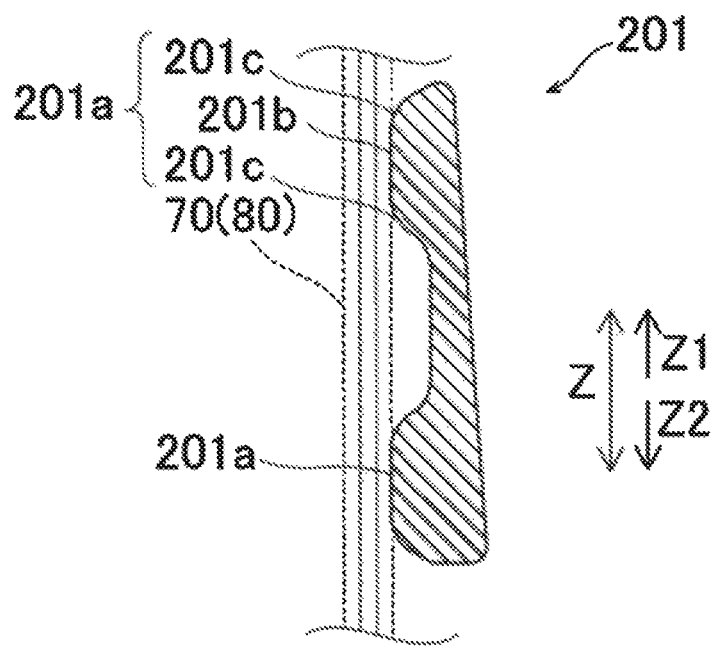
FIG. 14 is a diagram for describing the pressing jig of the first embodiment of the preferred embodiment.

In addition, as shown in FIGS. 12 and 14, each pressing jig 201 includes contact portions 201a that come into contact with at least either one (both in the first embodiment) of a first segment conductor 70 and a second segment conductor 80. Each contact portion 201a has a shape whose corner parts are chamfered as viewed in the circumferential direction. Specifically, in the contact portions 201a, portions 201b that come into contact with the first segment conductor 70 and the second segment conductor 80 have a flat surface shape, and portions 201c connected to the portions 201b have a curved shape as viewed in the circumferential direction.

In addition, two contact portions 201a are provided so as to protrude toward the radial outer side. The two contact portions 201a are provided so as to be axially separated from each other. In addition, the two contact portions 201a are configured to press locations corresponding to joint parts 90 between held-in-slot parts 42a and 42b (see FIG. 12). By the pressing jig 201 pressing the held-in-slot parts 42a and 42b, the joint part 90 provided on a Z1-direction side and the joint part 90 provided on a Z2-direction side are simultaneously pressed by the two contact portions 201a, respectively.

In addition, as shown in FIG. 12, the device 200 for manufacturing the stator 100 is provided with a push-out member 203 and a holding member 204. The holding member 204 is configured to hold the pressing jig 201 and the push-out member 203. In addition, the push-out member 203 is formed, for example, in wedge shape (tapered shape) that becomes gradually thinner toward one axial side, and is configured to transmit a pressing force to segment conductors 40 while allowing the pressing jig 201 to move toward the radial outer side by pressing (pushing out) the pressing jig 201 toward the radial outer side by axially moving.

(Method for Manufacturing the Stator)

Figure 15:
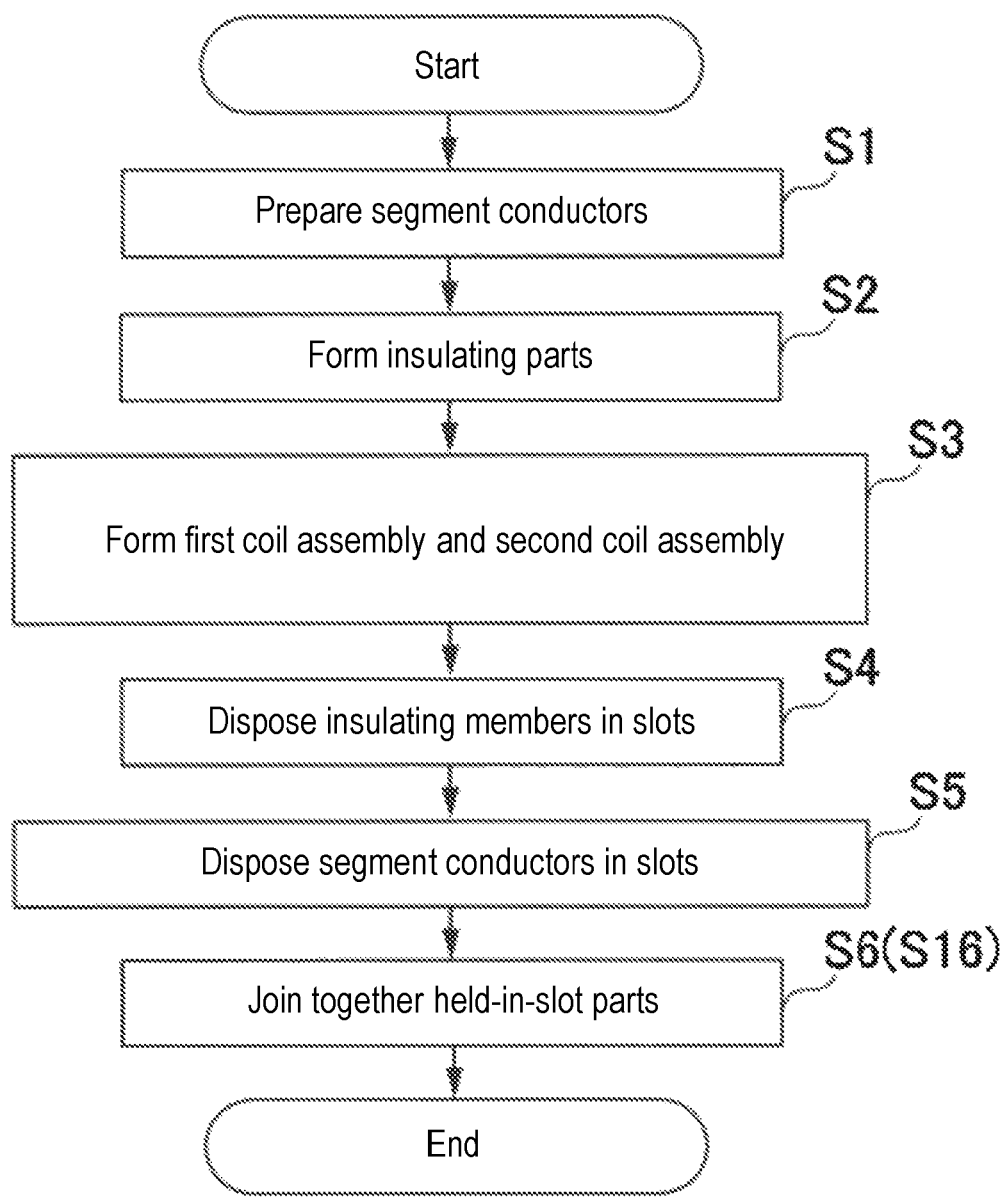
FIG. 15 is a flowchart showing steps of manufacturing the stator of the first embodiment of the preferred embodiment.

Next, a method for manufacturing the stator 100 of the first embodiment will be described. FIG. 15 shows a flowchart for describing the method for manufacturing the stator 100.

(Step of Preparing Segment Conductors)

First, at step S1, a plurality of segment conductors 40 are prepared. Specifically, there are prepared power conductors 50 that form power-line connection end parts Pt for each phase of a Y-connected coil part 30; neutral point conductors 60 that form neutral-point connection end parts Nt for each phase of the coil part 30; and general conductors 41 that form other portions of the coil part 30.

For example, as shown in FIG. 8(a), an insulating film 40a made of an insulating material such as polyimide is formed (coated) on a rectangular conductor surface 40b made of a conductive material such as copper. Thereafter, conductors (rectangular conducting wires) having the insulating films 40a formed thereon are shaped by a forming jig (not shown), by which general conductors 41 (see FIG. 9), outside diameter side power conductors 52 and inside diameter side power conductors 53 for forming power conductors 50, outside diameter side neutral point conductors 61, and inside diameter side neutral point conductors 62 are formed.

<Formation of General Conductors>

Specifically, as shown in FIG. 9, a pair of held-in-slot parts 42a and 42b having different axial lengths and disposed in different slots 12 (e.g., the slot pitch is six) and a coil end part 43 that connects the pair of held-in-slot parts 42a and 42b are formed, by which a general conductor 41 is formed. Note that the formation of power conductors 50 and neutral point conductors 60 is omitted.

<Formation of Insulating Parts>

Then, at step S2 (see FIG. 15), an insulating part 120 having a thickness t2 larger than a thickness t1 of the insulating film 40a at a joint part 90 is provided on the conductor surface 40b of each segment conductor 40.

As shown in FIG. 9, an insulating part 120 is formed by mounting an insulating member 121 on a held-in-slot part 42a which is one of a pair of held-in-slot parts 42a and 42b that has a longer axial length. Specifically, insulating members 121 are mounted on each of the held-in-slot parts 42a of the general conductors 41, the held-in-slot parts 42a of the outside diameter side power conductors 52, and the held-in-slot parts 42a of the outside diameter side neutral point conductors 61.

Figure 8B:
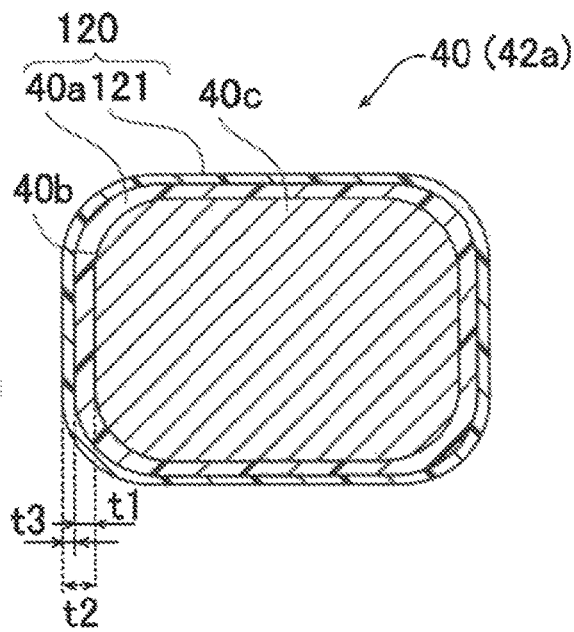

Specifically, as shown in FIG. 8(b), a sheet-like insulating member 121 having a thickness t3 smaller than the thickness t1 is wound around a held-in-slot part 42a once or more and fixed. By this, when the number of windings is one, an insulating part 120 having a thickness t2 (=t1+t3) larger than the thickness t1 is formed on the held-in-slot part 42a.

(Formation of a First Coil Assembly and a Second Coil Assembly)

At step S3, as shown in FIG. 3, a first coil assembly 30a and a second coil assembly 30b each having an annular shape and including a plurality of segment conductors 40 are formed.

Figure 16:
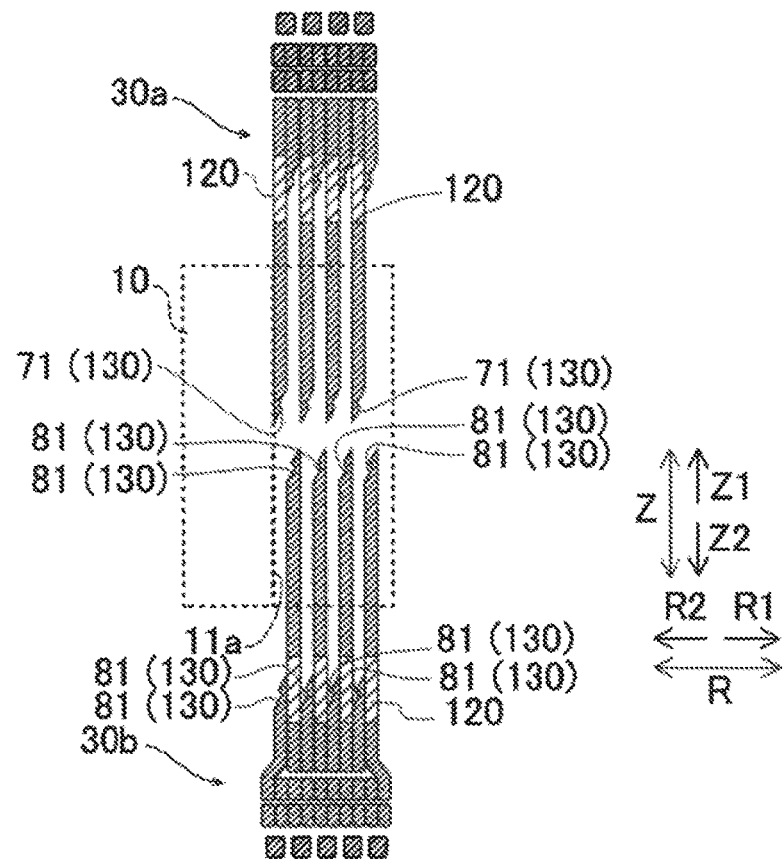
FIG. 16 is a diagram for describing a step of disposing segment conductors in a slot of the first embodiment of the preferred embodiment.

As shown in FIGS. 3 and 16, a first coil assembly 30a and a second coil assembly 30b each having an annular shape and including a plurality of segment conductors 40 are formed such that an insulating part 120 of one segment conductor 40 is located in a position radially adjacent to a joint part 90 of another segment conductor 40 disposed radially adjacent to the one segment conductor 40. Note that although FIG. 3 only shows some (two) of the plurality of insulating parts 120 by hatching for the sake of description, in the first embodiment, the insulating parts 120 are provided on all held-in-slot parts 42a.

Specifically, as shown in FIG. 3, a first coil assembly 30a having an annular shape is formed such that a plurality of general conductors 41, the power conductors 50 for three phases, the outside diameter side neutral point conductors 61, and the inside diameter side neutral point conductors 62 have substantially the same disposition relationship as that obtained when they are disposed in the plurality of slots 12 (a completed state of the stator 100). In addition, a second coil assembly 30b having an annular shape is formed such that a plurality of general conductors 41 have substantially the same disposition relationship as that obtained when they are disposed in the plurality of slots 12.

Specifically, as shown in FIG. 16, in the first coil assembly 30a and the second coil assembly 30b, the segment conductors 40 are formed such that a plurality of (e.g., eight) segment conductors 40 are parallelly and radially arranged and such a number of segment conductors 40 that is equal to the number of the slots 12 are parallelly and circumferentially arranged. At this time, the first coil assembly 30a and the second coil assembly 30b are formed such that the insulating part 120 of one of the plurality of segment conductors 40 parallelly arranged is located in an axial position corresponding to a joint part 90 of another segment conductor 40 disposed radially adjacent thereto.

(Step of Disposing Insulating Members in the Slots)

Figure 17:
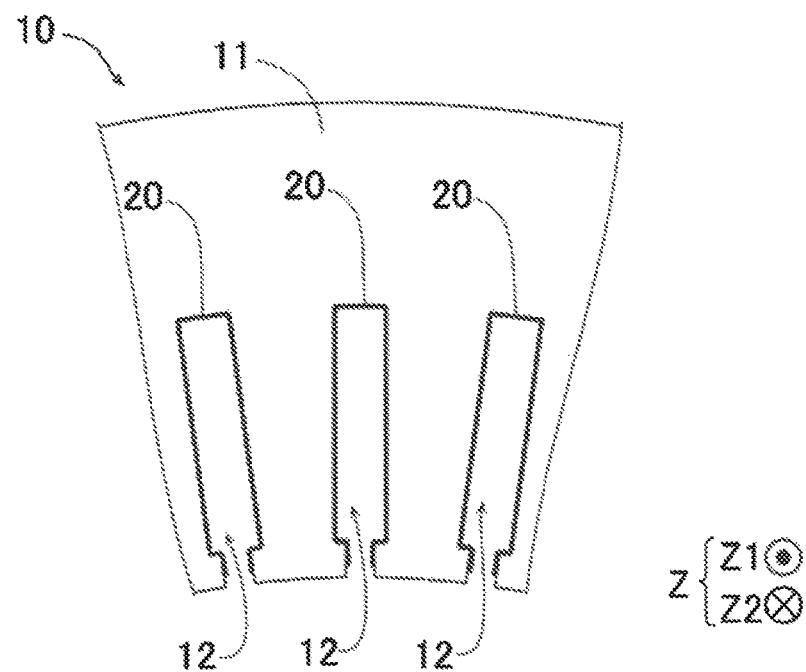
FIG. 17 is a cross-sectional view for describing a step of disposing insulating members in slots of the first embodiment of the preferred embodiment.

At step S4 (see FIG. 15), as shown in FIG. 17, insulating members 20 are disposed in each of the plurality of slots 12. The insulating members 20 are disposed so as to be exposed or open on the radial inner side and both axial sides. In addition, as shown in FIG. 3, the disposed insulating members 20 are held in the slots 12 by collar parts 22 on both axial sides.

(Step of Disposing the Segment Conductors in the Slots)

At step S5 (see FIG. 15), as shown in FIG. 16, the plurality of segment conductors 40 are disposed in the plurality of slots 12. Namely, both the first coil assembly 30a (the first held-in-slot parts 71 of the first segment conductors 70) and the second coil assembly 30b (the second held-in-slot parts 81 of the second segment conductors 80) are inserted into the plurality of slots 12.

Specifically, first, as shown in FIG. 3, the first coil assembly 30a is disposed more on the arrow "Z1" direction side (e.g., right above) than the stator core 10. In addition, the second coil assembly 30b is disposed more on the arrow "Z2" direction side (e.g., right below) than the stator core 10. At this time, as shown in FIG. 16, a joint material 130 is disposed on a surface of at least one of a first surface 172 of a first held-in-slot part 71 and a second surface 182 of a corresponding second held-in-slot part 81 of the first coil assembly 30a or the second coil assembly 30b, the first surface 172 and the second surface 182 axially facing each other.

Then, as shown in FIG. 12, the first coil assembly 30a and the second coil assembly 30b are allowed to axially move relative to each other toward the plurality of slots 12, by which each of the held-in-slot parts 42a and 42b of the first coil assembly 30a and the second coil assembly 30b is disposed in each slot 12 among the plurality of slots 12. For example, the first coil assembly 30a is allowed to move in parallel (linearly move) to the stator core 10 in the arrow "Z2" direction and the second coil assembly 30b is allowed to move in parallel (linearly move) to the stator core 10 in the arrow "Z1" direction, by which each of the held-in-slot parts 42a and 42b is disposed in each slot 12 (a slot 12 having an insulating member 20 disposed thereon) among the plurality of slots 12.

In addition, as shown in FIG. 11, by disposing the first coil assembly 30a and the second coil assembly 30b in the slots 12, the plurality of segment conductors 40 are disposed in the slots 12 such that the insulating part 120 of one of a plurality of segment conductors 40 parallelly and radially arranged is located in an axial position corresponding to a first facing surface 72 or a second facing surface 82 (a portion serving as a joint part 90) of another segment conductor 40 disposed radially adjacent thereto.

(Step of Joining Together the Held-in-Slot Parts)

At step S6 (see FIG. 15), in the first embodiment, as shown in FIGS. 12 and 13, a first held-in-slot part 71 of a first segment conductor 70 and a second held-in-slot part 81 of a second segment conductor 80 axially facing the first segment conductor 70 are radially pressed (pressurized) on a per slot 12 basis, by which the first held-in-slot part 71 and the second held-in-slot part 81 are joined together in a slot 12. In addition, in the first embodiment, in order that a pressurized load can be (substantially uniformly) applied to the joint parts 90 at which the first segment conductors 70 and the second segment conductors 80 disposed in the plurality of slots 12 are joined together, the first held-in-slot parts 71 and the second held-in-slot parts 81 are independently and radially pressed on a per slot 12 basis.

Specifically, in the first embodiment, first, the pressing jigs 201 disposed for each of the plurality of slots 12 are allowed to independently and radially move on a per slot 12 basis. The pressing jigs 201 are independently moved by the movement mechanism parts 202 provided for each pressing jig 201. By this, each pressing jig 201 is brought into contact with both of a first segment conductor 70 and a second segment conductor 80 (a joint part 90), by which the pressing jig 201 is positioned. That is, all pressing jigs 201 are brought into a state of being in contact with both the first segment conductors 70 and the second segment conductors 80 (joint parts 90). Note that there is a case in which due to manufacturing error of first segment conductors 70 and second segment conductors 80, variations occur in the radial positions of the first segment conductors 70 and the second segment conductors 80 in the slots 12. However, since the plurality of pressing jigs 201 independently and radially move, all pressing jigs 201 can come into contact with both the first segment conductors 70 and the second segment conductors 80 (joint parts 90).

Then, in the first embodiment, after positioning each pressing jig 201 by bringing the pressing jig 201 into contact with a first segment conductor 70 and a second segment conductor 80, the pressing jigs 201 (the plurality of pressing jigs 201) disposed for each of the plurality of slots 12 are allowed to simultaneously and radially move, by which the first segment conductors 70 and the second segment conductors 80 are pressed. Specifically, in the first embodiment, a plurality of segment conductors 40 are radially arranged side by side in a single slot 12. Segment conductors 40 disposed on the innermost side in each of the plurality of slots 12 are independently and radially pressed by the pressing jigs 201, by which other segment conductors 40 disposed between a segment conductor 40 disposed on the innermost side and a wall part 11a of the back yoke 11 of the stator core 10 are pressed by segment conductors 40 radially adjacent thereto. In addition, the plurality of pressing jigs 201 move toward the radial outer side at the same time. Here, since the movement distances of the plurality of pressing jigs 201 after positioning are equal to each other, it becomes possible to substantially uniformly pressurize each of the plurality of joint parts 90.

Then, in the first embodiment, by heating a first segment conductor 70 and a second segment conductor 80, with a pressurized load being uniformly applied to the first segment conductor 70 and the second segment conductor 80 by pressing the first segment conductor 70 and the second segment conductor 80, the first segment conductor 70 and the second segment conductor 80 are joined together with a joint material 130. Specifically, by heating at least a joint material 130 by a heating device (not shown) while held-in-slot parts 42a and 42b are pressed by a pressing jig 201, at least a part of a first facing surface 72 (first joint surface 72a) and at least a part of a second facing surface 82 (second joint surface 82a) are joined together, forming a joint part 90. Note that the first joint surface 72a and the second joint surface 82a are an example of "joint surfaces" in the claims.

As shown in FIG. 13, a pressing jig 201 is disposed at an opening part 12a of a slot 12 (on the radial inner side of the slot 12). By this, a plurality of held-in-slot parts 42a and 42b parallelly and radially arranged are brought into a state of being sandwiched, on both radial sides thereof, by the pressing jig 201 and a wall part 11a of the stator core 10. Then, the pressing jig 201 causes a pressing force (load) on the plurality of held-in-slot parts 42a and 42b parallelly and radially arranged toward the radial outer side, by which a reaction force directed to the radial inner side from the wall part 11a occurs, and the plurality of held-in-slot parts 42a and 42b parallelly and radially arranged are brought into a state of being pressed from both radial sides.

Then, in one slot 12, first held-in-slot parts 71 of a power conductor 50 and a neutral point conductor 60 and second held-in-slot parts 81 which are either one of held-in-slot parts 42a and 42b of general conductors 41 are joined together, and in another slot 12, second held-in-slot parts 81 which are the other one of the held-in-slot parts 42a and 42b of the general conductors 41 and first held-in-slot parts 71 of general conductors 41 are joined together. As a result, a wave-shaped coil part 30 is formed.

As shown in FIG. 11, a portion at which a first held-in-slot part 71 and a second held-in-slot part 81 are joined together serves as an electrically joined joint part 90. By this, an insulating part 120 is disposed in a position (axial position) radially adjacent to the joint part 90. In addition, an axial position P11 of a joint part 90 is a position different from an axial position P12 of a joint part 90 of segment conductors 40 radially adjacent thereto.

In addition, when first held-in-slot parts 71 and second held-in-slot parts 81 are pressed by a pressing jig 201 from the inside diameter side, an insulating member 20 is bent by the pressing jig 201, by which the radial inner sides of a first held-in-slot part 71 and a second held-in-slot part 81 that are disposed on the radially innermost side are covered by the insulating member 20. Thereafter, as shown in FIG. 2, a stator 100 is completed. Note that as shown in FIG. 1, by combining the stator 100 with a rotor 101, a rotating electrical machine 102 is manufactured.

Second Embodiment

Next, with reference to FIGS. 18 to 20, a structure of a stator 300 of a second embodiment will be described. Note that the configurations of a stator core 10, insulating members 20, and a coil part 30 are the same as those of the above-described first embodiment and thus description thereof is omitted.

(Structure of Segment Conductors)

As shown in FIG. 18, a segment conductor 340 includes held-in-slot parts 342a and 342b which are disposed in slots 12; and a coil end part 343. In addition, the coil end part 343 has a bent shape that axially bends. In addition, as shown in FIG. 19, the coil end part 343 has a crank portion 343a formed in crank shape that radially bends in a stepwise manner for an amount corresponding to a width W10 of a single segment conductor 340 as viewed in the axial direction. That is, a width W12 in the radial direction of the crank portion 343a is double the width W10 of a single segment conductor 340. Note that the crank portion 343a is an example of a "top part" in the claims.

In addition, as shown in FIG. 18, a plurality of segment conductors 340 include a first segment conductor 370 disposed on one axial side of the stator core 10 (the arrow "Z1" direction side); and a second segment conductor 380 disposed on the other axial side of the stator core 10 (the arrow "Z2" direction side).

(Configuration of Joint Parts)

As shown in FIG. 18, in a slot 12 of the stator core 10, a first held-in-slot part 371 of the first segment conductor 370 and a second held-in-slot part 381 of the second segment conductor 380 axially facing the first segment conductor 370 are joined together at a joint part 390. Note that the first held-in-slot part 371 and the second held-in-slot part 381 are an example of "pressing-target segment conductors" in the claims.

An end part on the Z2-direction side of the first held-in-slot part 371 has an end surface 371a made of a plane formed so as to be along an axially orthogonal plane. In addition, an end part on the Z1-direction side of the second held-in-slot part 381 has an end surface 381a made of a plane formed so as to be along an axially orthogonal plane. By joining together the end surface 371a of the first held-in-slot part 371 and the end surface 381a of the second held-in-slot part 381 with a joint material which is not shown, a joint part 390 is formed.

(Device for Manufacturing the Stator)

Next, a device 400 for manufacturing the stator 300 will be described. In the second embodiment, as shown in FIG. 20, the device 400 for manufacturing the stator 300 includes pressing jigs 401. The pressing jigs 401 are configured to independently press at least either one (both in the second embodiment) of first segment conductors 370 and second segment conductors 380 which are disposed in a plurality of slots 12, in a central axis line direction on a per segment conductor 340 basis. The pressing jigs 401 are disposed for each of the plurality of segment conductors 340 and configured to be movable in the central axis line direction. In addition, a plurality of (the same number as the total number of the first segment conductors 370 and the second segment conductors 380) pressing jigs 401 are provided so as to available for the plurality of segment conductors 340. In addition, the pressing jigs 401 have a rod shape (bolt shape). Note that the pressing jigs 401 are an example of "second pressing jigs" in the claims.

In addition, in the second embodiment, the device 400 for manufacturing the stator 300 includes movement mechanism parts 402 that allow the pressing jigs 401 to independently move on a per segment conductor 340 basis. The movement mechanism parts 402 are provided for each of the plurality of pressing jigs 401 and configured to be able to adjust the amount of axial movement on a per pressing jig 401 basis. The movement mechanism parts 402 are composed of, for example, actuators.

Figure 20:
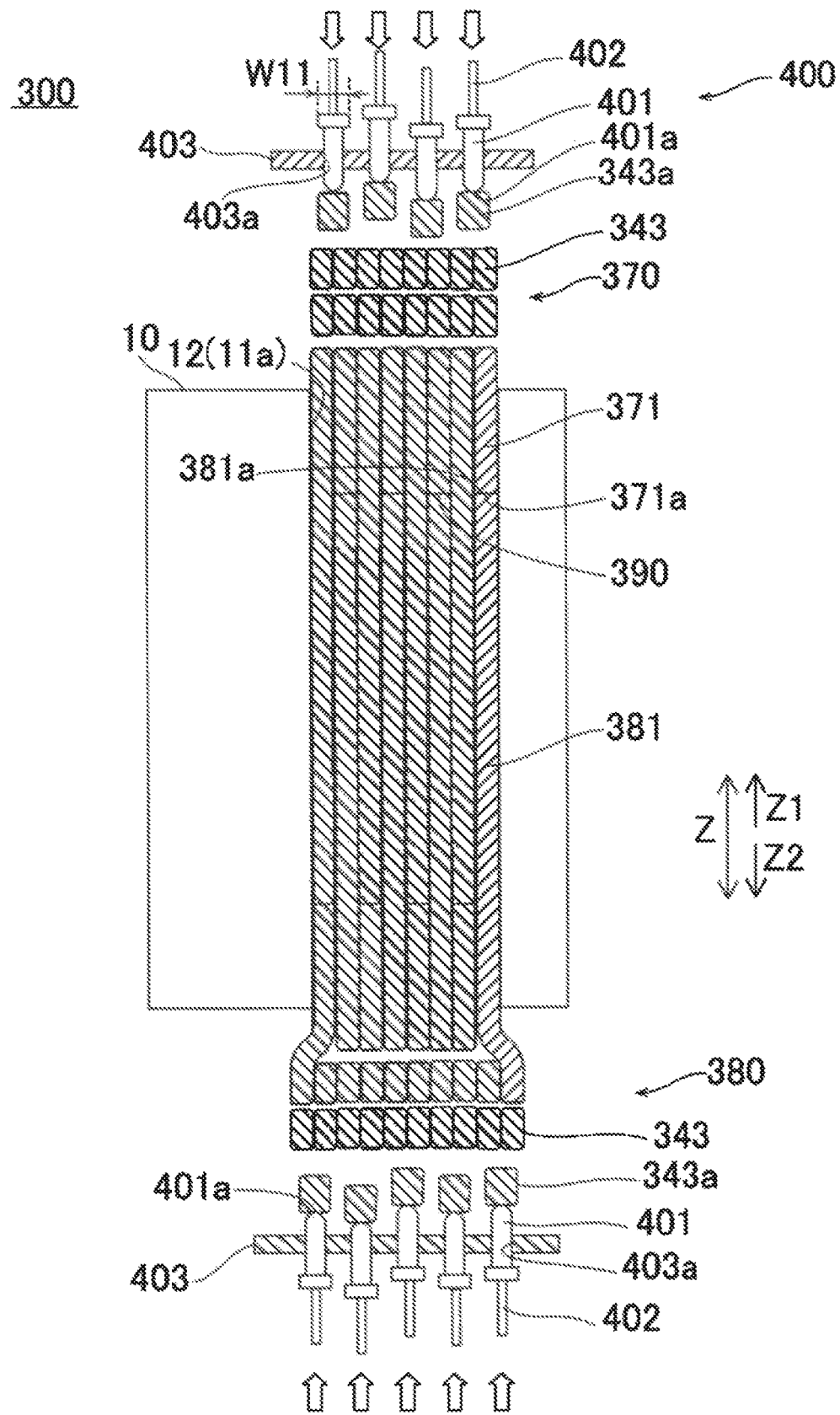
FIG. 20 is a diagram showing a device for manufacturing a stator of the second embodiment of the preferred embodiment.

In addition, as shown in FIG. 20, the pressing jigs 401 include contact portions 401a that come into contact with at least either one (both in the second embodiment) of first segment conductors 370 and second segment conductors 380. The contact portions 401a have a hemispherical shape. Note that the contact portions 401a each are an end part on a first segment conductor 370 side (a second segment conductor 380 side) of the pressing jig 401.

In addition, in the second embodiment, a width W11 in the radial direction of the pressing jig 401 is less than or equal to double the width W10 in the radial direction of a single segment conductor 340 which is the width W12 in the radial direction of the crank portion 343a (see FIG. 19). Here, the crank portions 343a of the first segment conductors 370 (second segment conductors 380) are disposed so as to be radially adjacent to each other. In order to prevent a plurality of pressing jigs 401 from interfering with each other when the pressing jigs 401 press adjacent crank portions 343a, the width W11 of the pressing jigs 401 is configured to be less than or equal to the width W12 of the crank portions 343a.

In addition, in the second embodiment, the manufacturing device 400 includes fixing and moving jigs 403. The fixing and moving jigs 403 are configured such that as will be described later, after positioning the pressing jigs 401, the fixing and moving jigs 403 fix together the pressing jigs 401 which are disposed for each of the plurality of segment conductors 340, and allow the pressing jigs 401 to move in the central axis line direction. The fixing and moving jigs 403 have, for example, a plate shape provided with hole parts 403a through which the pressing jigs 401 pass.

(Method for Manufacturing the Stator)

Next, a method for manufacturing the stator 300 of the second embodiment will be described. Note that in the method for manufacturing the stator 300, step S1 to S5 and step S7 (see FIG. 15) are the same as those of the above-described first embodiment, and thus, description thereof is omitted.

(Step of Joining Together Held-in-Slot Parts)

At step S16 (see FIG. 15), in the second embodiment, as shown in FIG. 20, at least either one (both in the second embodiment) of first segment conductors 370 and second segment conductors 380 which are disposed in a plurality of slots 12 are independently pressed in the central axis line direction on a per segment conductor 340 basis, by which the first segment conductors 370 and the second segment conductors 380 are joined together. Specifically, the first segment conductor 370 and the second segment conductor 380 are pressed such that a pressurized load is applied to each of joint parts 390 between the first segment conductors 370 and the second segment conductors 380.

Specifically, in the second embodiment, first, the pressing jigs 401 disposed for each of the plurality of segment conductors 340 are allowed to independently move in the central axis line direction on a per segment conductor 340 basis to come into contact with at least either one of the first segment conductors 370 and the second segment conductors 380, by which the pressing jigs 401 are positioned. Note that the pressing jigs 401 are disposed on both one and other sides in the central axis line direction, and are positioned with respect to both the first segment conductors 70 and the second segment conductors 80. Note that FIG. 20 shows a state in which there are variations in the height positions of the crank portions 343a of the coil end parts 343. Then, by allowing the pressing jigs 401 to independently move, even when there are variations in the height positions of the crank portions 343a, the pressing jigs 401 can be brought into contact with all crank portions 343a.

Then, in the second embodiment, the pressing jigs 401 disposed for each of the plurality of segment conductors 340 are fixed together by the fixing and moving jigs 403. A plurality of pressing jigs 401 are fixed by a fixing and moving jig 403, with the pressing jigs 401 passing through hole parts 403a of the fixing and moving jig 403. Then, by allowing the fixing and moving jigs 403 to move in the central axis line direction, the first segment conductors 370 and the second segment conductors 380 are joined together. That is, the movement distances of the plurality of pressing jigs 401 after positioning are equal to each other. By this, it becomes possible to substantially uniformly pressurize each of the plurality of joint parts 390. Note that the fixing and moving jigs 403 are provided on both one and other axial sides of the stator core 10. Then, the fixing and moving jigs 403 provided on the one and other axial sides move in a direction in which they approach each other. By this, in the second embodiment, the first segment conductors 370 and the second segment conductors 380 are independently pressed by the pressing jigs 401 from both one and other sides in the central axis line direction.

In addition, in the second embodiment, the first segment conductors 370 and the second segment conductors 380 are joined together by allowing the pressing jigs 401 disposed for each of the plurality of segment conductors 340 to simultaneously move in the central axis line direction. Since the plurality of pressing jigs 401 are fixed to the fixing and moving jigs 403 as described above, by the fixing and moving jigs 403 axially moving, the plurality of pressing jigs 401 simultaneously and axially move.

In addition, in the second embodiment, a first segment conductor 370 and a second segment conductor 380 are joined together by pressing a crank portion 343a of a coil end part 343 of at least either one (both in the second embodiment) of the first segment conductor 370 and the second segment conductor 380. Since the crank portion 343a of the coil end part 343 is located on the axially outermost side of the segment conductor 340, by the pressing jig 401 axially moving, the pressing jig 401 comes into contact with the crank portion 343a. By this, the crank portion 343a is pressed. Then, by performing a step (step S7) of covering the joint parts 390 by insulating members 20 as in the above-described first embodiment after joining together the first segment conductors 370 and the second segment conductors 380, a stator 300 is completed.

Advantageous Effects of the Manufacturing Methods of the First and Second Embodiments By the manufacturing methods of the above-described first and second embodiments, the following advantageous effects can be obtained.

In the first and second embodiments, as described above, there is included a step of independently pressing pressing-target segment conductors by a plurality of pressing jigs (201, 401) disposed for each pressing-target segment conductor, such that the plurality of pressing jigs (201, 401) are movable relative to each other, at least either one of first segment conductors (70, 370) and second segment conductors (80, 380) disposed in a plurality of slots (12) serving as the pressing-target segment conductors. By this, even when there are variations in the positions of the first segment conductors (70, 370) and the second segment conductors (80, 380) with respect to the slots (12) due to manufacturing error of the first segment conductors (70, 370) and the second segment conductors (80, 380), since the first segment conductors (70, 370) and the second segment conductors (80, 380) are independently pressed, a sufficient pressing force can be applied to each of the first segment conductors (70, 370) and the second segment conductors (80, 380) which are disposed in the plurality of slots (12). As a result, the quality of joints between the first segment conductors (70, 370) and the second segment conductors (80, 380) can be improved.

In addition, in the first and second embodiment, as described above, the first segment conductors (70, 370) and the second segment conductors (80, 380) which are disposed in the plurality of slots (12) are pressed such that a pressurized load is applied to each of joint parts (90, 390) at which the first segment conductors (70, 370) and the second segment conductors (80, 380) are joined together. By configuring in this manner, since a pressurized load is applied to each joint part (90, 390), the quality of a joint of each joint part (90, 390) can be improved.

In addition, in the first and second embodiments, as described above, after positioning the pressing jigs (201, 401), the positioned pressing jigs (201, 401) are allowed to move in a radial direction or a central axis line direction, by which the first segment conductors (70, 370) and the second segment conductors (80, 380) are pressed. By configuring in this manner, since each pressing jig (201, 401) is positioned so as to come into contact with at least either one of a first segment conductor (70, 370) and a second segment conductor (80, 380), each joint part (90, 390) at which the first segment conductor (70, 370) and the second segment conductor (80, 380) are joined together can be sufficiently pressurized.

In addition, in the first embodiment, as described above, after positioning first pressing jigs (201) disposed for each of the plurality of slots (12) by allowing the first pressing jigs (201) to independently and radially move to come into contact with the first segment conductors (370) and the second segment conductors (380), the first pressing jigs (201) disposed for each of the plurality of slots (12) are allowed to simultaneously and radially move, by which the first segment conductors (70) and the second segment conductors (80) are pressed. By configuring in this manner, since the plurality of first pressing jigs (201) disposed for each of the plurality of slots (12) simultaneously and radially move, unlike a case in which the plurality of first pressing jigs (201) are allowed to move separately at different times, the time required for a step of joining together the first segment conductors (70) and the second segment conductors (80) can be reduced.

In addition, in the first embodiment, as described above, in each of the plurality of slots (12), a segment conductor (40) disposed on the innermost side is independently and radially pressed by a first pressing jig (201), and other segment conductors (40) disposed between the segment conductor (40) disposed on the innermost side and a yoke part (11) of an armature core (10) are pressed by segment conductors (40) radially adjacent thereto. By configuring in this manner, only by pressing a segment conductor (40) disposed on the innermost side, a plurality of segment conductors (40) disposed in a slot (12) can be easily pressed.

In addition, in the second embodiment, as described above, after positioning second pressing jigs (401) disposed for each of a plurality of segment conductors (340) by allowing the second pressing jigs (401) to independently move in the central axis line direction to come into contact with at least either one of the first segment conductors (370 and the second segment conductors (380), the second pressing jigs (401) disposed for each of the plurality of segment conductors (340) are allowed to simultaneously move in the central axis line direction, by which the first segment conductors (370) and the second segment conductors (380) are pressed. By configuring in this manner, since the plurality of second pressing jigs (401) disposed for each of the plurality of segment conductors (340) simultaneously move in the central axis line direction, unlike a case in which the plurality of second pressing jigs (401) are allowed to move separately at different times, the time required for a step of pressing the first segment conductors (370) and the second segment conductors (380) can be reduced.

In addition, in the second embodiment, as described above, the first segment conductors (370) and the second segment conductors (380) are independently pressed by the second pressing jigs (401) from both of one side and the other side in the central axis line direction. By configuring in this manner, even when both the first segment conductors (370) and the second segment conductors (380) have variations in the height positions of their coil end parts (343) due to manufacturing error, the first segment conductors (370) and the second segment conductors (380) are both independently pressed. By this, a pressurized load can be applied to both the first segment conductors (370) and the second segment conductors (380).

In addition, in the second embodiment, as described above, the positioned second pressing jigs (401) which are disposed for each of the plurality of segment conductors (340) are fixed together by fixing and moving jigs (403), and the fixing and moving jigs (403) are allowed to move in the central axis line direction, by which the first segment conductors (370) and the second segment conductors (380) are joined together. By configuring in this manner, since the plurality of second pressing jigs (401) are fixed by the fixing and moving jigs (403), the plurality of second pressing jigs (401) can be easily simultaneously moved by the fixing and moving jigs (403).

In addition, in the second embodiment, as described above, the first segment conductors (370) and the second segment conductors (380) are joined together by pressing top parts (343a) of coil end parts (343) of at least either one of the first segment conductors (370) and the second segment conductors (380). By configuring in this manner, since the top parts (343a) of the coil end parts (343) are portions of the segment conductors (340) located on the outermost side in the central axis line direction, the top parts (343a) can be easily pressed by the second pressing jigs (401) that move in the central axis line direction.

In addition, in the first and second embodiments, as described above, by heating the first segment conductors (70) and the second segment conductors (80), with a pressurized load being uniformly applied to the first segment conductors (70) and the second segment conductors (80) by pressing the first segment conductors (70) and the second segment conductors (80), the first segment conductors (70) and the second segment conductors (80) are joined together with joint materials (130). By configuring in this manner, since a pressurized load is uniformly applied to the first segment conductors (70) and the second segment conductors (80), the first segment conductors (70) and the second segment conductors (80) can be securely joined together.

Advantageous Effects of the Manufacturing Devices of the First and Second Embodiments By the manufacturing devices (200, 400) of the first and second embodiments, the following advantageous effects can be obtained.

In the first and second embodiments, as described above, there are included pressing jigs (201, 401) that independently and radially press, on a per slot (12) basis, at least either one of first held-in-slot parts (71) of first segment conductors (70, 370) disposed on one side in a central axis line direction of an armature core (10) and second held-in-slot parts (81) of second segment conductors (80, 380) disposed on the other side in the central axis line direction of the armature core (10) among a plurality of segment conductors (40, 340), or independently press at least either one of the first held-in-slot parts (71) and the second held-in-slot parts (81) in the central axis line direction on a per segment conductor (40, 340) basis, the first segment conductors (70, 370) and the second segment conductors (80, 380) being disposed in a plurality of slots (12). By this, a device (200, 400) for manufacturing an armature that can improve the quality of joints between the first segment conductors (70, 370) and the second segment conductors (80, 380) can be provided.

In addition, in the first and second embodiments, as described above, contact portions (201a, 401a) of the pressing jigs (201, 401) that come into contact with at least either one of the first segment conductors (70, 370) and the second segment conductors (80, 380) have a shape whose corner parts are chamfered or a hemispherical shape. By configuring in this manner, unlike a case in which the contact portions (201a, 401a) of the pressing jigs (201, 401) have a sharp-pointed shape, damage to at least either one of the first segment conductors (70, 370) and the second segment conductors (80, 380) caused by coming into contact with the contact portions (201a, 401a) can be prevented.

In addition, in the first embodiment, as described above, a plurality of first pressing jigs (201) are provided so as to be available for the plurality of slots (12), and configured to be independently and radially movable on a per first pressing jig (201) basis. By configuring in this manner, the first held-in-slot parts (71) and the second held-in-slot parts (81) which are held in the slots (12) can be independently pressed on a per slot (12) basis.

In addition, in the second embodiment, as described above, a plurality of second pressing jigs (401) are provided so as to be available for the plurality of segment conductors (340), and configured to be independently movable in the central axis line direction on a per second pressing jig (401) basis. By configuring in this manner, the plurality of segment conductors (340) can be easily independently pressed on a per segment conductor (340) basis.

In addition, in the second embodiment, a radial width (W11) of the second pressing jigs (401) is less than or equal to double a radial width (W10) of a single segment conductor (340) which is a radial width (W12) of crank portions (343a). By configuring in this manner, when a plurality of crank portions (343a) are disposed radially adjacent to each other, second pressing jigs (401) that press each of the plurality of crank portions (343a) can be prevented from interfering with each other.

In addition, in the second embodiment, there are provided fixing and moving jigs (403) that fix together positioned second pressing jigs (401) and allow the positioned second pressing jigs (401) to move in the central axis line direction. By configuring in this manner, the plurality of second pressing jigs (401) can be simultaneously moved by the fixing and moving jigs (403). By this, the time required for a step of joining together the first segment conductors (370) and the second segment conductors (380) can be reduced.

[Variants]

Note that the presently disclosed embodiments are to be considered in all respects as illustrative and not restrictive. The scope of the preferred embodiment is indicated by the claims, rather than the description of the above-described embodiments, and all changes (variants) which come within the meaning and range of equivalency of the claims are further embraced therein.

For example, although the above-described first and second embodiments show an example in which two held-in-slot parts (42a and 42b) of a segment conductor have different lengths, the preferred embodiment is not limited thereto. For example, the two held-in-slot parts of the segment conductor may have the same length.

In addition, although the above-described first embodiment shows an example in which a single pressing jig is provided with two contact portions, the preferred embodiment is not limited thereto. For example, a single pressing jig may be provided with one or three or more contact portions.

Figure 21:
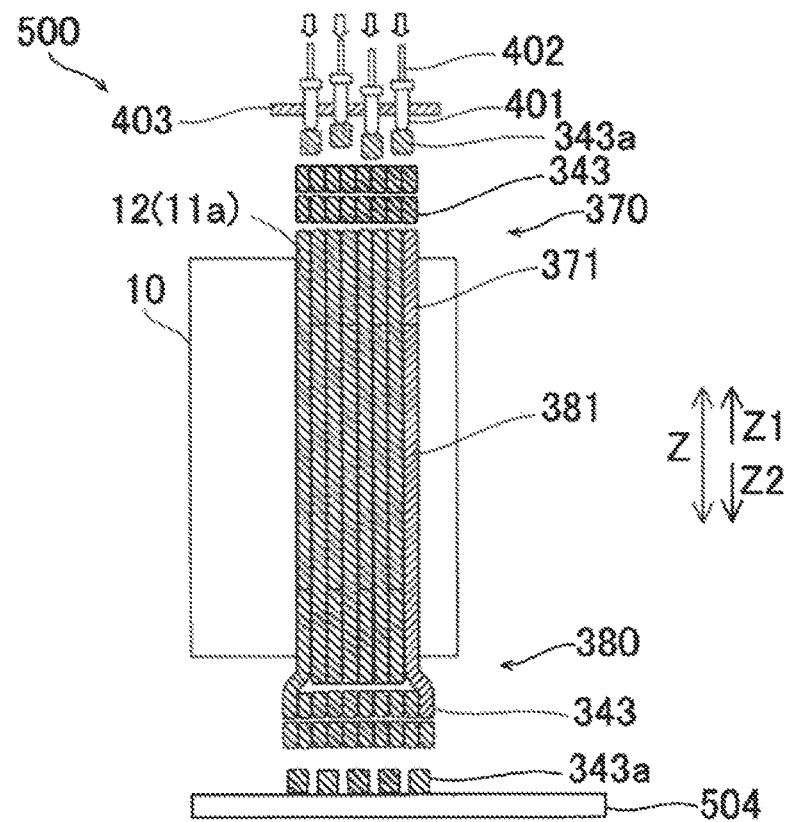
FIG. 21 is a diagram showing a device for manufacturing a stator of a first variant.

In addition, although the above-described second embodiment shows an example in which first segment conductors and second segment conductors are independently pressed by pressing jigs from both of one side and the other side in the central axis line direction, the preferred embodiment is not limited thereto. For example, as in a manufacturing device 500 shown in a first variant of FIG. 21, a plate-like member 504 having a flat surface may be disposed on one axial side (in FIG. 21, a Z2-direction side), and first segment conductors 370 may be pressed by pressing jigs 401 only from the other side in the central axis line direction (in FIG. 21, a Z1-direction side). Note that second segment conductors 380 are pressed by a reaction force from the plate-like member 504. Note also that instead of the plate-like member 504, the second segment conductors 380 may be fixed by a clip-like fixing member, and the first segment conductors 370 may be pressed by the pressing jigs 401 only from the other side in the central axis line direction (in FIG. 21, the Z1-direction side).

Figure 22:
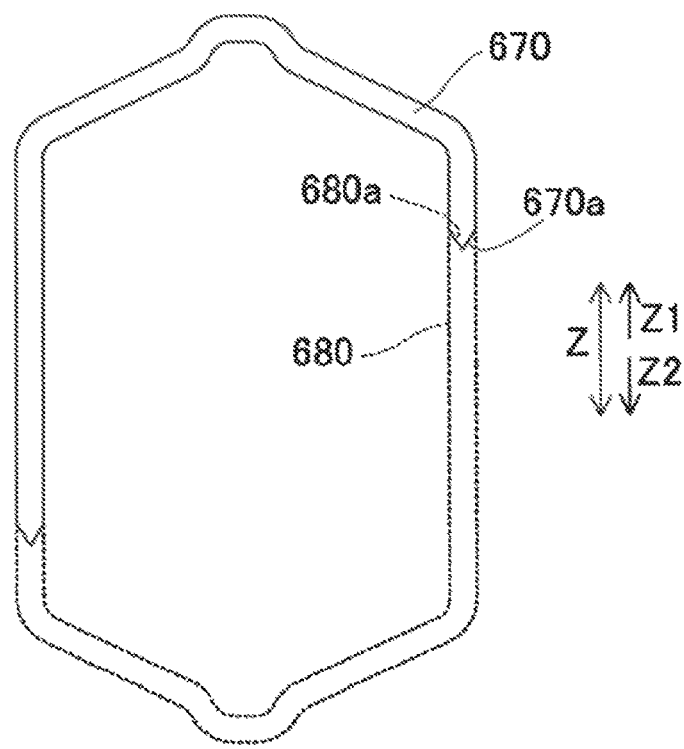
FIG. 22 is a diagram showing a configuration of a segment conductor of a second variant.

In addition, although the above-described second embodiment shows an example in which end surfaces (portions to be joined) of a first segment conductor and a second segment conductor are planar, the preferred embodiment is not limited thereto. For example, as in a first segment conductor 670 and a second segment conductor 680 shown in a second variant of FIG. 22, an end part 670a of the first segment conductor 670 may have a projecting shape (or a recessed shape) and an end part 680a of the second segment conductor 680 may have a recessed shape (or a projecting shape).

In addition, although the above-described first and second embodiments show an example in which a coil end part is provided with a crank portion, the preferred embodiment is not limited thereto. For example, the coil end part may not be provided with the crank portion.

In addition, although the above-described first and second embodiments show an example in which movement mechanism parts are provided for each pressing jig, the preferred embodiment is not limited thereto. For example, after each of a plurality of pressing jigs abuts on a segment conductor such that the amount of movement to a point where the pressing jig abuts on the segment conductor is relatively adjustable, all pressing jigs may be pressed with a uniform pressing force by a single movement mechanism part.

In addition, although the above-described first and second embodiments show an example in which a joint part is disposed in a slot, the preferred embodiment is not limited thereto. For example, the joint part may be disposed outside the slot.

REFERENCE SIGNS LIST

10: Stator core (armature core), 11: Back yoke (yoke part), 12: Slot, 30: Coil part, 40, 340: Segment conductor, 42a, 42b, 342a, 342b: Held-in-slot part (leg part), 43, 343: Coil end part, 43a, 343a: Crank portion (top part), 70, 370, 670: First segment conductor, 71, 371: First held-in-slot part (pressing-target segment conductor), 72a: First joint surface (joint surface), 80, 380, 680: Second segment conductor, 81, 381: Second held-in-slot part (pressing-target segment conductor), 82a: Second joint surface (joint surface), 90, 390: Joint part, 100, 300: Stator (armature), 130: Joint material, 200, 400, 500: Manufacturing device, 201: Pressing jig (first pressing jig), 201a, 401a: Contact portion, 202, 402: Movement mechanism part, 401: Pressing jig (second pressing jig), and 403: Fixing and moving jig.

The invention claimed is:

1. A method for manufacturing an armature including an armature core provided with a plurality of slots extending in a central axis line direction; and a coil part including a plurality of segment conductors having leg parts extending in the central axis line direction, the plurality of leg parts being joined together, the method comprising:
    a step of disposing, in the plurality of slots, both of first leg parts of first segment conductors disposed on one side in a central axis line direction of the armature core among the plurality of segment conductors and second leg parts of second segment conductors disposed on an other side in a central axis line direction of the armature core; and
    a joining step of joining together the first segment conductors and the second segment conductors disposed in the plurality of slots,
    wherein
    the joining step includes a step of independently pressing pressing-target segment conductors by a plurality of pressing jigs disposed for each of the pressing-target segment conductors, such that the plurality of pressing jigs are movable relative to each other, at least either one of the first segment conductors and the second segment conductors disposed in the plurality of slots serving as the pressing-target segment conductors.

2. The method for manufacturing an armature according to claim 1, wherein the step of pressing the pressing-target segment conductors is a step of pressing the pressing-target segment conductors such that a pressurized load is applied to each of joint parts at which the first segment conductors and the second segment conductors disposed in the plurality of slots are joined together.

3. The method for manufacturing an armature according to claim 1, wherein the step of pressing the pressing-target segment conductors is a step of a step of pressing the pressing-target segment conductors by positioning the plurality of pressing jigs disposed for each of the pressing-target segment conductors, and then allowing the positioned pressing jigs to move.

4. The method for manufacturing an armature according to claim 3, wherein
    the pressing jigs include first pressing jigs disposed for each of the plurality of slots and configured to be radially movable, and
    the step of pressing the pressing-target segment conductors is a step of pressing the pressing-target segment conductors by positioning the first pressing jigs disposed for each of the plurality of slots by allowing the first pressing jigs to independently and radially move to come into contact with the first segment conductors and the second segment conductors, and then allowing the first pressing jigs disposed for each of the plurality of slots to simultaneously and radially move.

5. The method for manufacturing an armature according to claim 4, wherein the plurality of segment conductors are radially arranged side by side in the single slot, and the step of pressing the pressing-target segment conductors by allowing the first pressing jigs to radially move is a step of independently and radially pressing the segment conductor disposed on an innermost side in each of the plurality of slots by a corresponding one of the first pressing jigs, and pressing other segment conductors disposed between the segment conductor disposed on the innermost side and a yoke part of the armature core by the segment conductors radially adjacent to the other segment conductors.

6. The method for manufacturing an armature according to claim 3, wherein the pressing jigs include second pressing jigs disposed for each of the plurality of segment conductors and configured to be movable in a central axis line direction, and the step of pressing the pressing-target segment conductors is a step of pressing the pressing-target segment conductors by positioning the second pressing jigs disposed for each of the plurality of segment conductors by allowing the second pressing jigs to independently move in a central axis line direction to come into contact with at least either one of the first segment conductors and the second segment conductors, and then allowing the second pressing jigs disposed for each of the plurality of segment conductors to simultaneously move in a central axis line direction.

7. The method for manufacturing an armature according to claim 6, wherein the step of pressing the first segment conductors and the second segment conductors by the second pressing jigs is a step of independently pressing the first segment conductors and the second segment conductors by the second pressing jigs from both of one side and an other side in a central axis line direction.

8. The method for manufacturing an armature according to claim 6, wherein the step of pressing the first segment conductors and the second segment conductors by the second pressing jigs is a step of pressing the pressing-target segment conductors by positioning the second pressing jigs disposed for each of the plurality of segment conductors by allowing the second pressing jigs to independently move in a central axis line direction to come into contact with at least either one of the first segment conductors and the second segment conductors, and then fixing together the second pressing jigs disposed for each of the plurality of segment conductors by a fixing and moving jig, and allowing the fixing and moving jig to move in a central axis line direction.

9. The method for manufacturing an armature according to claim 6, wherein the segment conductors each further include a coil end part protruding outward in a central axis line direction from the armature core, and the step of pressing the first segment conductors and the second segment conductors by the second pressing jigs is a step of pressing top parts of the coil end parts of at least either one of the first segment conductors and the second segment conductors.

10. The method for manufacturing an armature according to claim 1, wherein joint surfaces on which the first segment conductors and the second segment conductors are joined together are provided with joint materials, and the method further comprises a step of joining together the first segment conductors and the second segment conductors with the joint materials by heating the first segment conductors and the second segment conductors, with a pressurized load being uniformly applied to the first segment conductors and the second segment conductors by pressing the pressing-target segment conductors.

* * * * *